US008832400B2

(12) United States Patent
Tatara et al.

(10) Patent No.: US 8,832,400 B2
(45) Date of Patent: Sep. 9, 2014

(54) STORAGE APPARATUS AND CONTROL METHOD THEREOF

(71) Applicant: Hitachi, Ltd., Tokyo (JP)

(72) Inventors: Kohei Tatara, Yokohama (JP); Yoshiaki Eguchi, Yokohama (JP); Hisaharu Takeuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/926,340

(22) Filed: Jun. 25, 2013

(65) Prior Publication Data
US 2013/0290663 A1 Oct. 31, 2013

Related U.S. Application Data

(63) Continuation of application No. 12/920,249, filed as application No. PCT/JP2010/005042 on Aug. 11, 2010, now Pat. No. 8,484,426.

(51) Int. Cl.
*G06F 12/00* (2006.01)
*G06F 3/06* (2006.01)
*G06F 12/02* (2006.01)

(52) U.S. Cl.
CPC .............. *G06F 12/023* (2013.01); *G06F 3/067* (2013.01); *G06F 3/061* (2013.01); *G06F 3/0638* (2013.01); *G06F 3/0607* (2013.01)
USPC ............................ 711/162; 711/114; 711/170

(58) Field of Classification Search
USPC .................................................. 711/162, 114
See application file for complete search history.

(56) References Cited

U.S. PATENT DOCUMENTS 5,506,979 A 4/1996 Menon
6,041,386 A * 3/2000 Bello ................................ 711/4
(Continued)

FOREIGN PATENT DOCUMENTS

EP 1840721 10/2007
EP 1909165 4/2008
(Continued)

OTHER PUBLICATIONS

International Search Report in PCT/JP2010/005042, mailed Apr. 6, 2011.
Written Opinion in PCT/JP2010/005042, mailed Apr. 6, 2011.
(Continued)

*Primary Examiner* — Hashem Farrokh
(74) *Attorney, Agent, or Firm* — Mattingly & Malur, PC

(57) ABSTRACT

Improvement of read/write access performance with respect to a disk is proposed. A controller manages a first volume format LDEV, in which each distributed user data area and each distributed information area among a plurality of the distributed user data areas for storing a data part and a plurality of the distributed control information area for storing a control information part, are targets that capacity is changed. The controller also manages a second format LDEV, which include a plurality of groups each of which is formed from one distributed user data area and one distributed control information area, and in which each group is a unit that capacity is expanded in a real storage area. The controller converts a data address of the data part belonging to the first volume format LDEV into a data address of a data part of the second volume format LDEV in order to execute input/output processing with respect to the data part, when received an request for access to the data part belonging to the first volume format LDEV.

2 Claims, 22 Drawing Sheets

(56) References Cited

U.S. PATENT DOCUMENTS

| | | | |
|---|---|---|---|
| 2003/0088732 A1* | 5/2003 | Tadroda et al. | 711/112 |
| 2006/0036825 A1 | 2/2006 | Maki et al. | |
| 2006/0218207 A1 | 9/2006 | Nonaka | |
| 2007/0206224 A1 | 9/2007 | Nagashima et al. | |
| 2007/0277018 A1* | 11/2007 | Tanaka | 711/171 |
| 2008/0082778 A1* | 4/2008 | Inoue et al. | 711/170 |
| 2009/0216989 A1* | 8/2009 | Kato et al. | 711/171 |

FOREIGN PATENT DOCUMENTS

| | | |
|---|---|---|
| JP | 2008084053 | 4/2008 |
| JP | 2010072777 | 4/2010 |

OTHER PUBLICATIONS

Written Opinion of the International Preliminary Examining Authority for PCT/JP2010/005042, mailed Jul. 3, 2012.

* cited by examiner

FIG.7

| LDEV NUMBER (701) | POOL NUMBER (702) |
|---|---|
| 2 | 1 |
| 3 | 2 |
| ... | ... |

| POOL NUMBER (801) | DISK NUMBER (802) |
|---|---|
| 1 | 1 |
|   | 2 |
| 2 | 3 |
|   | 4 |
| ... | ... |

(800)

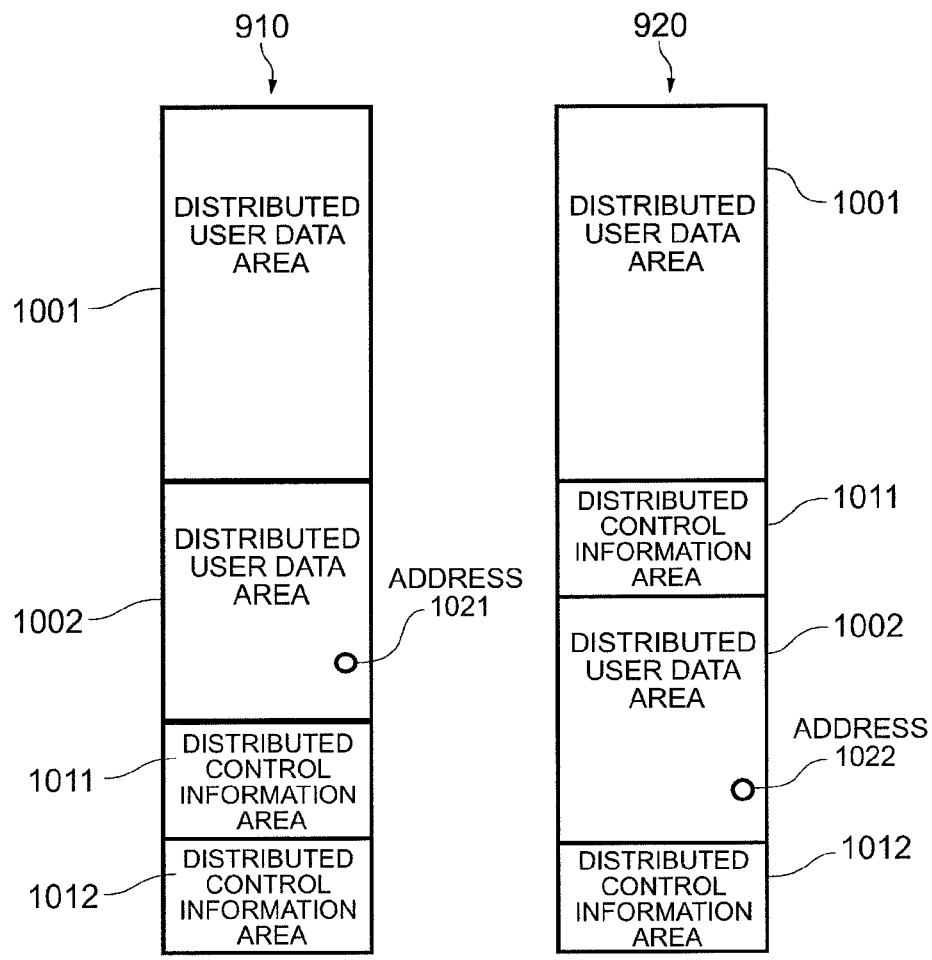

FIG.12

| i | START ADDRESS (3390 FORMAT) OF DISTRIBUTED USER AREA i | START ADDRESS OF DISTRIBUTED USER DATA AREA i (DATA PLACEMENT IN REAL STORAGE AREA(1)) | START ADDRESS OF DISTRIBUTED CONTROL INFORMATION ARE (3390 FORMAT) | START ADDRESS OF DISTRIBUTED CONTROL INFORMATION AREA i (DATA PLACEMENT (1) IN REAL STORAGE AREA) |
|---|---|---|---|---|
| 1 | 0 | 0 | 250 | 150 |
| 2 | 150 | 165 | 265 | 265 |
| ⋮ | ... | ... | ... | ... |

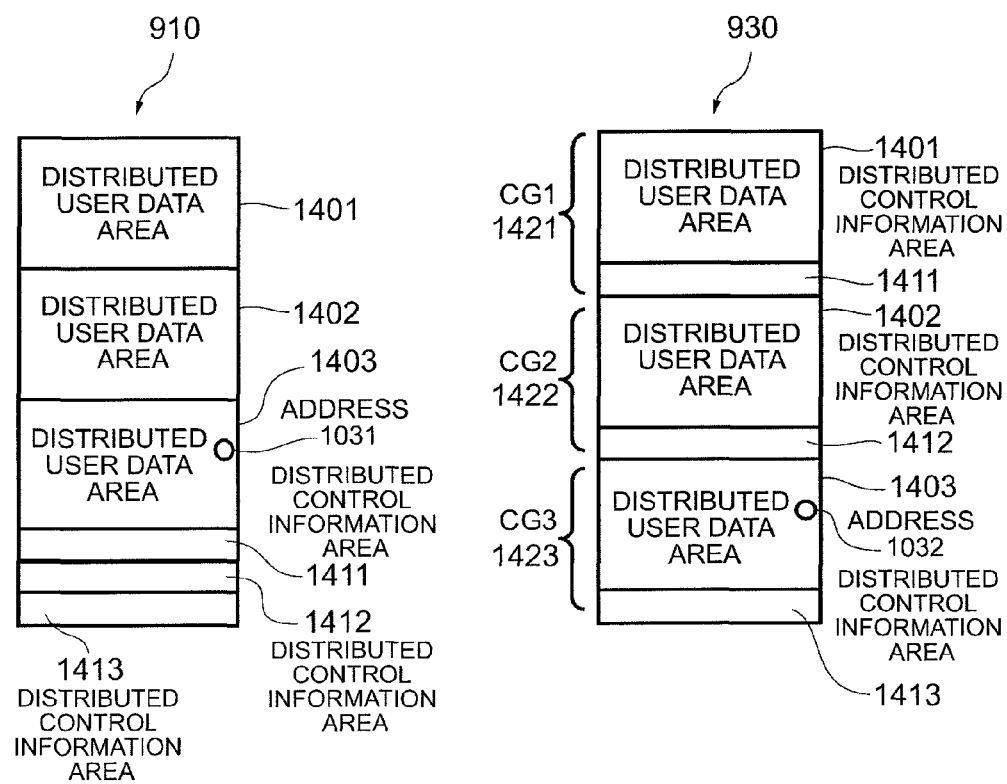

FIG.18

| i | START ADDRESS OF DISTRIBUTED USER DATA AREA i (3390 FORMAT) | START ADDRESS OF DISTRIBUTED USER DATA AREA i (3390-A FORMAT) | START ADDRESS OF DISTRIBUTED CONTROL INFORMATION AREA i (3390 FORMAT) | START ADDRESS OF DISTRIBUTED CONTROL INFORMATION AREA i (3390-A FORMAT) |
|---|---|---|---|---|
| 1 | 0 | 0 | 500 | 100 |
| 2 | 100 | 150 | 550 | 250 |
| 3 | 200 | 300 | 600 | 400 |
| 4 | 300 | 450 | 650 | 550 |
| 5 | 400 | 600 | 700 | 700 |
| ... | ... | ... | ... | ... |

FIG.23

| DISTRIBUTED USER DATA AREA NUMBER | ADDRESS IN LDEV 2202 | DISTRIBUTED CONTROL INFORMATION AREA NUMBER | ADDRESS IN LDEV 2203 |
|---|---|---|---|
| 1 | 0 | 1 | 0 |
| 2 | 100 | 2 | 50 |
| 3 | 200 | 3 | 100 |
| ... | ... | ... | ... |

FIG.25

| PAGE NUMBER (2501) | LDEV PAGE START ADDRESS (2502) | DISK NUMBER (2503) | DISK PAGE START ADDRESS (2504) | ALLOCATED DETERMINATION INFORMATION (2505) |
|---|---|---|---|---|
| 1 | 0 | 1 | 128 | ALLOCATED |
| 2 | 128 | 2 | 128 | UNALLOCATED |
| 3 | 256 | 3 | 128 | ALLOCATED |
| 4 | 384 | 1 | 256 | ALLOCATED |
| 5 | 512 | 2 | 256 | UNALLOCATED |
| ... | ... | ... | ... | ... |

| LDEV NUMBER (2601) | ADDRESS OF PAGE MANAGEMENT TABLE (2602) |
|---|---|
| 2 | 0xC0000000 |
| 3 | 0xC0000100 |
| ... | ... |

2600

STORAGE APPARATUS AND CONTROL METHOD THEREOF

CROSS REFERENCES

This application is a continuation of application Ser. No. 12/920,249, filed Aug. 30, 2010, which is a National Stage entry of PCT/JP2010/005042, filed Aug. 11, 2010, the entire disclosures of which are incorporated herein by reference.

TECHNICAL FIELD

The present invention relates to a storage apparatus and control method for managing the data placement in volumes configured from storage devices.

BACKGROUND ART

Storage subsystems or storage apparatuses that employ disk drives etc., as the storage devices are known. When data input/output processing against the storage devices is controlled the disk head is aligned.

For example, according to PTL1, a volume configured of storage devices includes one or more tracks. In a real storage area of the storage device there are a control information part in a top of the track (home address, record 0) and a data part (record 1, record 2, . . . ) behind the control information part. If a mainframe (MF) host computer issues a request to a storage controller to read or write a track, the storage controller reads the track from the disk in accordance with a read command or write command, reads the value of the track control information part (home address), confirms the track position information, and executes read or write access to the data part after confirming that a head alignment has correctly been completed against the track.

CITATION LIST

Patent Literature

PTL 1: U.S. Pat. No. 5,506,979

SUMMARY OF INVENTION

Technical Problem

With the vigorous growth in online commercial transactions in recent years, performance improvements are desirable in read or write access to storage apparatuses connected to networks. Under this environment, the aforementioned storage controller expedites read access or write access processing by omitting the processing to confirm the track position information, and reading and writing only the data part from and to disks.

For example, when received a read access or write access request with respect to a track from the host computer, the storage controller dispenses with processing to confirm that processing to align the disk head at the track header has been correctly performed without referring to the control information value in the track, the transfer of a control information part to the storage controller from the disk is unnecessary, thereby enabling faster read access or write access processing.

However, the adoption of volume data placement, as disclosed in PTL1, involves a processing overhead for the storage controller, even though only a data part is to be read from the disk, in causing the disk head to skip the position of the control information part in the track header and positioning the head at the data part.

An object of the present invention is to provide a storage apparatus and control method thereof enabling to improve read/write access performance with respect to a disk.

Solution to Problem

In order to achieve the aforementioned object, the present invention comprising a controller which manages one or more logical volumes constructed in storage areas of the storage devices, wherein the controller manages volumes, which can be recognized by an access request source, as first logical volumes, and which comprise a storage area with a first data placement in which a plurality of first data areas where data parts are placed and a plurality of first control information areas where control information parts are placed are aligned side by side, wherein the controller manages volumes as second logical volumes, which includes a plurality of groups each of which is formed from the storage area in a real storage area of the storage devices, which comprises a storage area with a second data placement in which each of the groups is a unit at which capacity is changed, and which the storage area is including a second data area corresponding to the one first data area and a second control information area corresponding to the one first control information area, and wherein if an access request for access to a data part belonging to any of the first data areas is received, the controller calculates a first data address of the data part belonging to the first data area as an access destination based on the access request on the condition that it is unnecessary to refer to a control information part belonging to the first control information area, converts the calculated first data address into a second data address of a data part belonging to the second data area of any of the groups, and executes data input/output processing against the second logical volume in accordance with the converted second data address.

Advantageous Effects of Invention

With the present invention, it is possible to improve read/write access performance from and to a disk when it is not necessary to refer to a control information part.

BRIEF DESCRIPTION OF DRAWINGS

FIG. 7 is a configuration diagram of a management table for managing correspondence relationships between LDEV numbers and pool numbers.

FIG. 8 is a configuration diagram of a management table for managing correspondence relationships between pool numbers and disk numbers.

FIG. 10 is a configuration diagram illustrating data placement in a 3390 format LDEV and in a real storage area.

FIG. 11 is a configuration diagram of a management table for managing the sizes of distributed user data areas and distributed control information areas.

FIG. 12 is a configuration diagram of a management table for managing the addresses of distributed user data areas and distributed control information areas.

FIG. 16 is a configuration diagram illustrating correspondence relationships between address on a 3390 format LDEV and addresses on a 3390-A format LDEV.

FIG. 17 is a configuration diagram of a management table for managing the sizes of distributed user data areas and distributed control information areas.

FIG. 18 is a configuration diagram of a management table for managing the addresses of distributed user data areas and distributed control information areas.

FIG. 23 is a configuration diagram of a management table for managing the addresses of distributed user data areas and distributed control information areas in the third embodiment.

FIG. 25 is a configuration diagram of a page management table.

FIG. 26 is a configuration diagram of a page management directory.

DESCRIPTION OF EMBODIMENTS

Figure 1:
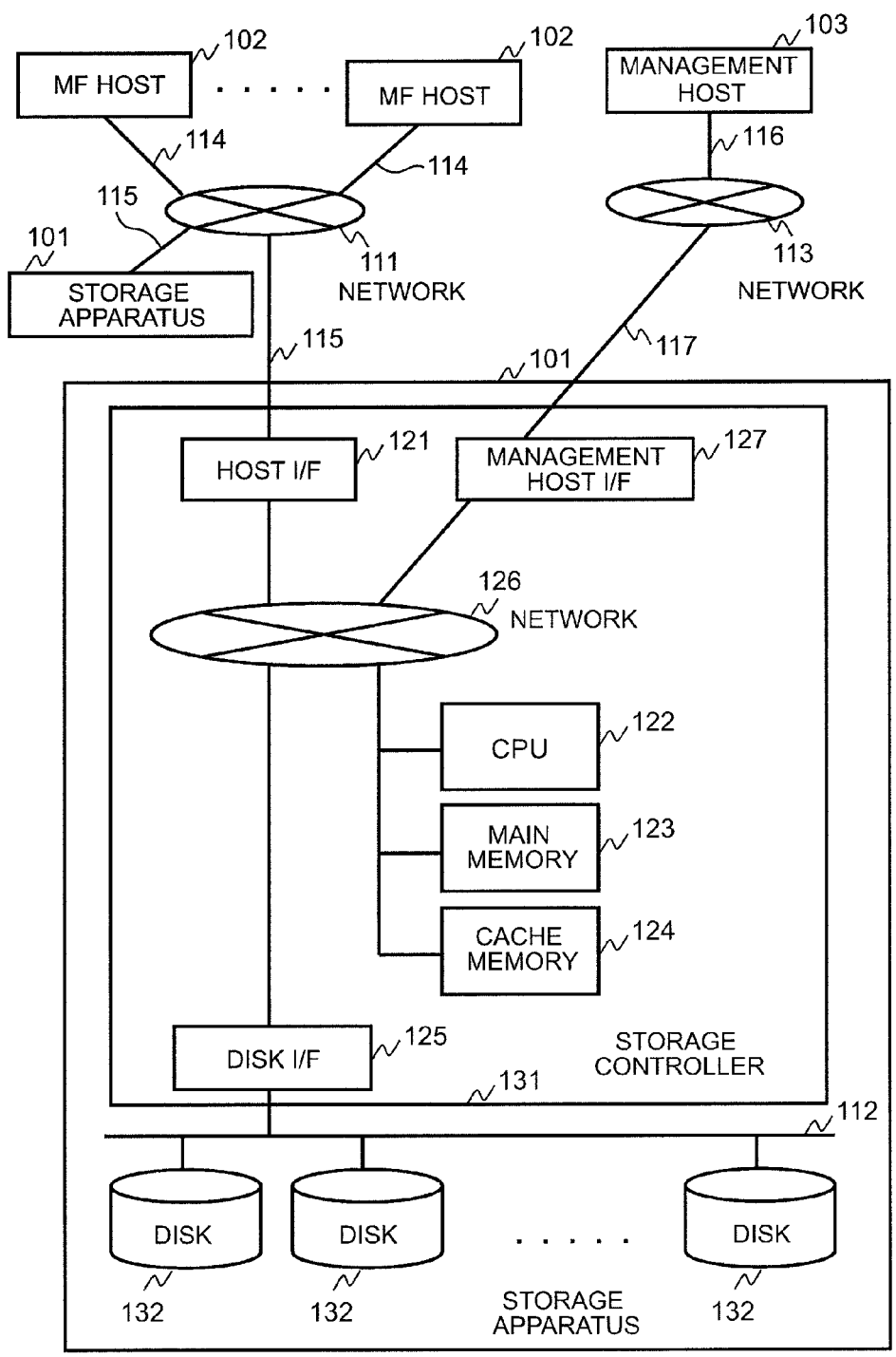
FIG. 1 is a block configuration diagram showing the overall configuration of a storage system.

An example of the present invention will be explained hereafter.

Note that in the following description various types of information are provided using expressions such as Management Table however that the various types of information may also be expressed using data structure other than a table. Furthermore, in order to show that there is no dependence on data structure, Management Table may be referred to as Management Information.

Furthermore, in the following description, the processing may sometimes be described with a program as the subject. However, since the program is run by a processor, for example a CPU (Central Processing Unit), predetermined processing is executed by suitably using storage resources (memory, etc.) and a communication interface device (communication port, etc.), and hence the processor may also be the subject of the processing. The processor may also comprise dedicated hardware in addition to the CPU. The computer program may be installed on each computer from a program source. The program source may be storage media or a program distribution server, and so on.

Furthermore, each component such as LDEV (Logical DEVice), for example, can be identified by a number and so on. However, as long as the information allows the components to be identified, other types of identification information such as names may also be employed.

Embodiments of the present invention will be explained hereafter using the drawings. In the drawings which follow, the same reference signs are assigned to identical parts. However, the present invention is not limited to these embodiments, rather all applications which conform to the spirit of this invention are included in the technological scope of the present invention. Furthermore, absent particular limitations, each of the components may be included as a single component or a plurality of components.

<Overall Configuration of Storage System>

FIG. 1 shows the overall configuration of a storage system

In FIG. 1, the storage system comprises a computer system that includes, for example, a plurality of storage apparatuses 101, a plurality of mainframe (MF) host computers 102, and a management host computer 103.

Each of the storage apparatuses 101 and MF host computers 102 are connected via a network 111, for example, and one storage apparatus (sometimes also referred to hereafter as the first storage apparatus) 101 of the plurality of storage apparatuses is connected to the management host computer 103 via a network 113, and so on.

The first storage apparatus 101 is connected to a different storage apparatus (sometimes also referred to hereafter as the second storage apparatus) via a network 111, and so on.

The MF host computers 102 are each connected to the network 111 via a communication line 114.

The storage apparatuses 101 are each connected to the network 111 via a communication line 115.

The management host computer 103 is connected to the network 113 via a communication line 116.

The first storage apparatus 101 is connected to the network 113 via a communication line 117.

Note that the abovementioned communication lines 114 to 117 comprise a fixed line such as a metal cable or optical fiber cable, and so on. However, each of the MF host computers 102 and storage apparatuses 101, the first storage apparatus 101 and the management computer 103, and each of the MF host computers 102 and management computer 103 can also each be connected wirelessly. In this case, the communication lines 114 to 117 are omitted.

Furthermore, the networks 111 and 113 may also be a common network. The networks 111 and 113 are each communication networks such as SANs (Storage Area Networks) or LANs (Local Area Networks), and so on.

The configuration of each storage apparatus 101 will be explained next.

The storage apparatuses 101 each comprise, for example, one or more storage controllers 131, and one or more disks 132. Note that the storage apparatuses 101 each have the same configuration and therefore the configuration of the first storage apparatus 101 will be explained hereafter.

One or more disks 132 include, as storage devices for storing data, at least an SSD (Solid State Drive), a SAS (Serial Attached SCSI)-HDD (Hard Disk Drive), or a SATA (Serial Advanced Technology Attachment)-HDD. Note that a physical storage device of another type may also be provided in place of or in addition to at least one of the aforementioned disks 132.

One or more disks 132 is connected to a storage controller 131 via a communication line 112 such as a Fibre channel cable, and so on. Note that one or more RAID (Redundant Array of Independent Disks) groups can be constructed from a plurality of disks 132.

The configuration of the storage controller 131 will be explained next.

The storage controller 131 controls input/output processing of data with respect to the disk 132, that is, controls data write (writing) or read (reading) with respect to the disk 132, in accordance with commands received from each MF host computer 102.

The storage controller 131 provides each MF host computer 102 which is an access request source with logical devices to which real storage area has already been allocated, or with logical devices comprising a virtual storage area which is used by a Thin Provisioning function (described subsequently), as logical devices or logical volumes which are access targets.

In the logical devices configured of a virtual storage area, a real storage area may or may not have already been allocated to them.

At this point, the storage controller 31 is able to refer to and identify the real storage area or virtual storage area by means of cylinder head numbers (track numbers hereafter), and so on.

The storage controller 131 comprises storage resources, a communication interface device (an interface device is abbreviated hereafter as I/F), and a CPU 122 which is connected to the storage resources and communication interface device, and so on.

The storage resources are a main memory 123 and a cache memory 124, and so on.

A host I/F 121, a management host I/F 127, and a disk I/F 125 are included as communication I/Fs, and so on. The main memory 123, cache memory 124, CPU 122, host I/F 121, management host I/F 127, and disk I/F 125 are connected to one another via a network 126 which comprises a communication line such as a bus. The management host I/F 127 is an NIC (Network Interface Card), and so on.

The hardware configurations of each of the MF host computers 102 and management host computers 103 are typically the same as the computer. That is, each of the MF host computers 102 and management host computers 103 comprise a communication interface device, storage resources, and a CPU which is connected to the communication interface device and storage resources. The communication interface device is, for example, a host bus adapter (HBA) for communicating via the network 111 and an NIC for communicating via the network 113. The storage resources comprise a memory and internal HDD, and so on.

Figure 2:
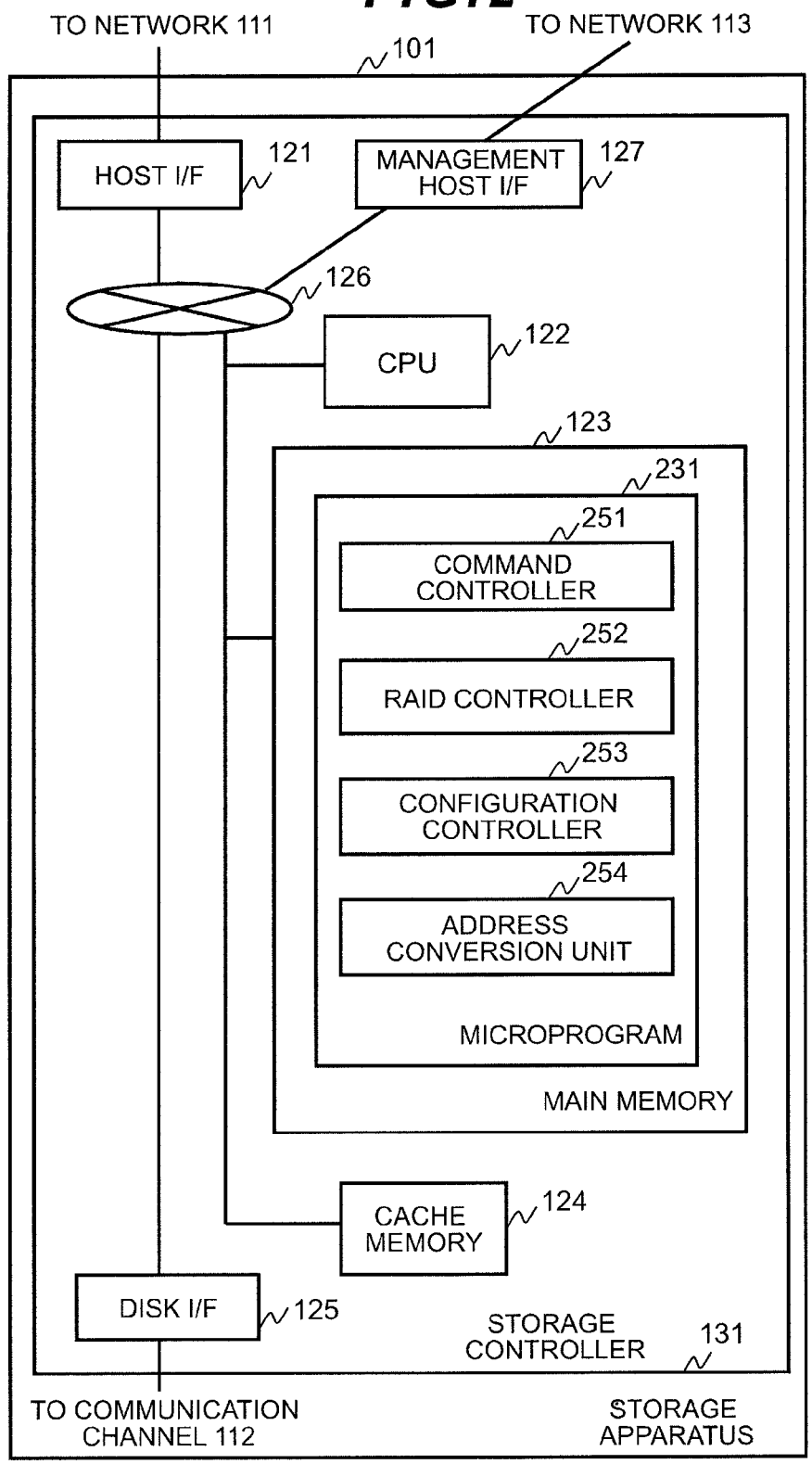
FIG. 2 is a configuration diagram showing the configuration of a microprogram which is executed in the storage controller.

FIG. 2 shows the configuration of a microprogram 231 which is executed in the storage controller 131.

In FIG. 2, one or more microprograms 231 are read by the CPU 122 to the main memory 123. The microprogram 231 comprises a command controller 251, a RAID controller 252, a configuration controller 253, and an address conversion unit 254. Various processing which will be described subsequently is carried out as a result of the CPU 122 executing each of the controllers 251 to 254 in the microprogram 231 that is read to the main memory 123.

For instance, the cache memory 124 is arranged to be a buffer that temporarily stores write data received from each MF host computer 102 and data read from the disk 132 by the RAID controller 252 in the microprogram 231.

The host I/F 121 is connected to each of the MF host computers 102 via the network 111, receives access commands as access requests (write commands or read commands) from each of the MF host computers 102, and transfers the received access commands to the command controller 251.

The management host I/F 127 is connected to the management host computer 103 via a network 113, and if an instruction to perform LDEV capacity expansion (described subsequently) or an inter-LDEV data copy instruction, for example, is received from the management host computer 103, the management host I/F 127 transfers the received instruction to the command controller 251 or configuration controller 253.

The disk I/F 125 sends and receives data between each of the disks 132 and the storage resources (the main memory 123 and cache memory 124). The disk I/F 125 is connected to each of the disks 132 via the communication channel 112.

The basic operation of the storage apparatus 101 will be described next in simple terms.

When a write command is received from any of the MF host computers 102 via the host I/F 121, the storage controller 131 stores write data which is received from the MF host computer 102 in the cache memory 124.

The storage controller 131 writes write data stored in the cache memory 124 to the disk 132 via the disk I/F 125. On an aside, the configuration may be such that the storage controller 131 informs the MF host computer 102 that the write command processing is complete at the point where the write data is stored in the cache memory 124, or informs the MF host computer 102 that the write command processing is complete at the point the write data is written to the disk 132.

When received a read command from the MF host computer 102, the storage controller 131 confirms whether or not the data (read target data) designated by the parameters in the read command is stored in the cache memory 124.

If the read target data is stored in the cache memory 124, the storage controller 131 reads the read target data from the cache memory 124 and transmits the read target data thus read to the MF host computer 102 via the host I/F 121. On the other hand, if the read target data is not stored in the cache memory 124, the storage controller 131 reads the read target data from one or more disks 132 via the disk I/F 125 and stores the read target data thus read in the cache memory 124. Thereafter, the storage controller 131 transmits read target data stored in the cache memory 124 to the MF host computer 102 via the disk I/F 121.

<Logical Configuration in the Storage Apparatus>

Figure 3:
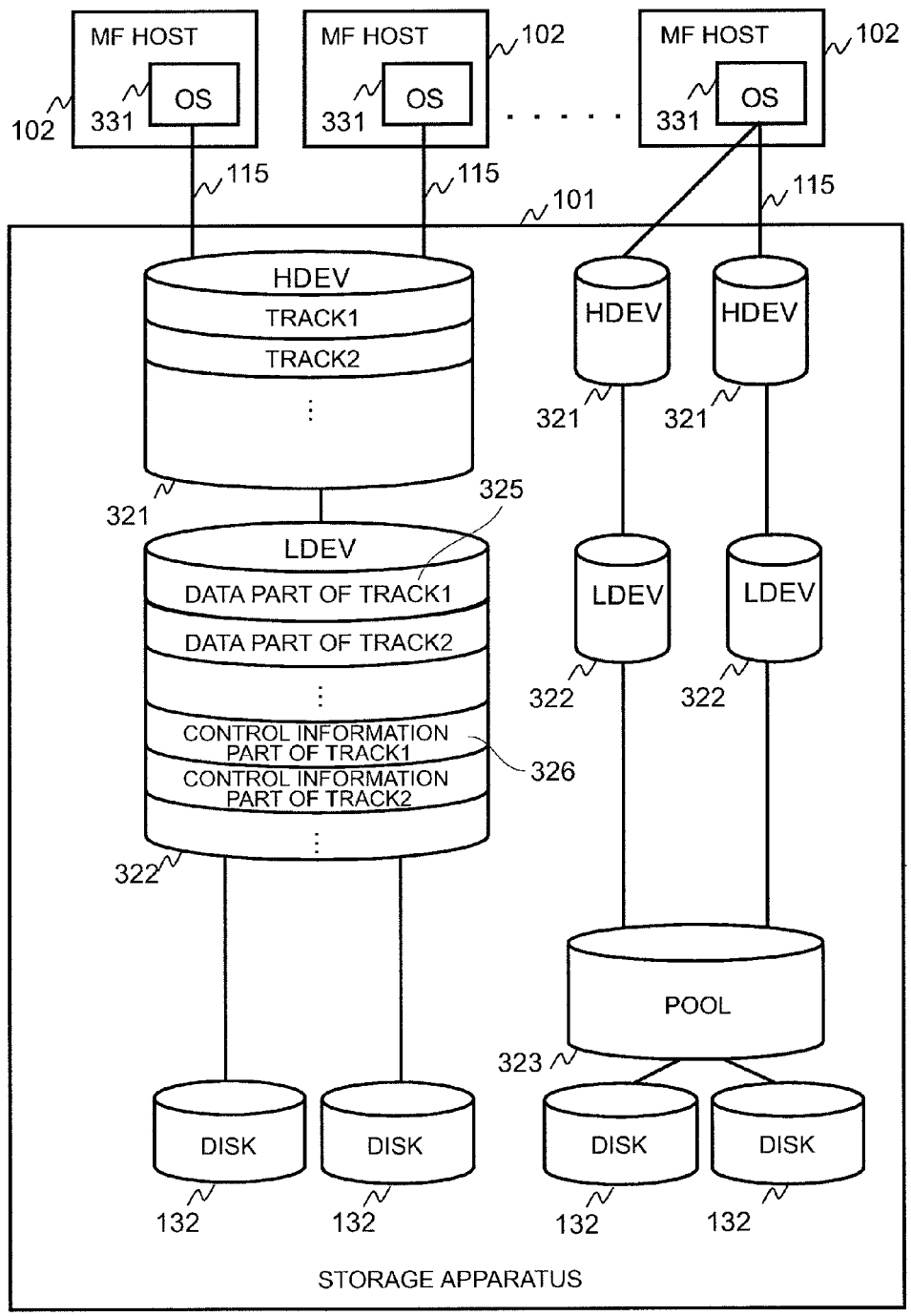
FIG. 3 is a configuration diagram showing the logical configuration in the storage apparatus.

FIG. 3 shows a logical configuration in the storage apparatus 101.

In FIG. 3, the storage apparatus 101 includes one or more host logical devices (hereinafter sometimes referred to as HDEV) as host logical devices comprising storage areas which are referred to by each of the MF host computers 102 and the management host computer 103.

Unique HDEV numbers are assigned to the HDEV 321 in the storage apparatus 101, and the MF host computers 102 and management host computer 103 and so on identify the HDEV 321 from the HDEV numbers. For example, an OS 331 on each of the MF host computers 102 performs read access or write access to the HDEV 321.

The HDEV 321 comprises an aggregate group of tracks (track1, track2, . . . ), and the cylinder head number (track number) assigned to each track is the reference target when the MF host computers 102 and the management host computer 103 identify each track.

One or more logical devices (hereinafter sometimes called LDEV or volumes) 322 are associated with the HDEV 321.

Unique LDEV numbers are assigned to the LDEV 322 in the storage apparatus 101, and the microprogram 231 identifies the LDEV 322 from the LDEV numbers.

The LDEV 322 is defined as a storage area in one or more disks 132, and so on. Furthermore, the LDEV 322 may also be defined as a storage area constructed from a plurality of RAID groups.

The LDEV 322 comprises a plurality of data parts 325 and a plurality of control information parts 326 which correspond to the tracks. The data parts 325 each comprise one or more records (not shown) which correspond to the tracks (track numbers), the records each storing data read or written by the MF host computers 102. The control information parts 326 comprise control information for accessing data parts 325 of each track or control information for referring to or updating the data parts 325 of each track.

Here, the size of all the tracks in the storage apparatus 101 is a fixed value. The sizes of all the data parts 325 and all the control information 326 in the storage apparatus 101 are fixed values.

Unique disk numbers are assigned to the disks 132 in the storage apparatus 101, and the microprogram 231 identifies each of the disks 132 from the disk numbers.

Furthermore, the LDEV 322 may be saved in a virtual volume that is used by a Thin Provisioning function (described subsequently).

The virtual volumes where the data of the LDEV 322 is saved are associated with a pool 323 which provides a real storage area to the virtual volume.

Unique pool numbers are assigned to the pools 323 in the storage apparatuses 101, and the microprogram 231 identifies the pool 323 from the pool numbers.

The pools 323 comprise one or more disks 132. The pools 323 may also comprise one or more RAID groups. One or more disks 132 may be installed inside or outside the storage apparatuses.

Figure 4:
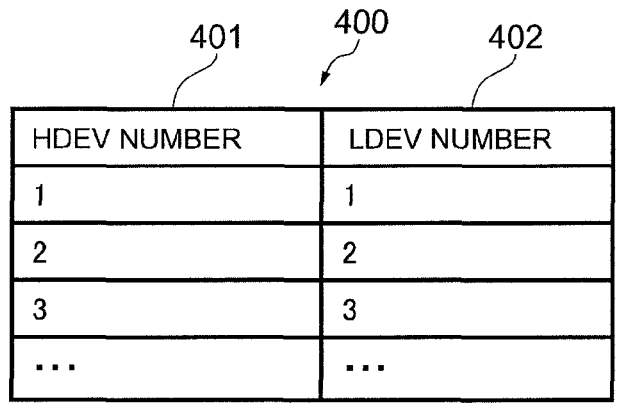
FIG. 4 is a configuration diagram of a management table for managing correspondence relationships between HDEV numbers and LDEV numbers.

FIG. 4 shows a configuration of a management table 400 for managing correspondence relationships between the HDEV numbers and LDEV numbers.

The management table 400 comprises an HDEV number field 401 and an LDEV number field 402. The HDEV number is a number for uniquely identifying the HDEV 321 in the storage apparatus 101 and each entry in the HDEV number field 401 stores a number which corresponds to a HDEV 321. The LDEV number is a number for uniquely identifying the LDEV 322 in the storage apparatus 101 and each entry in the LDEV number field 402 stores a number which corresponds to an LDEV 322.

Figure 5:
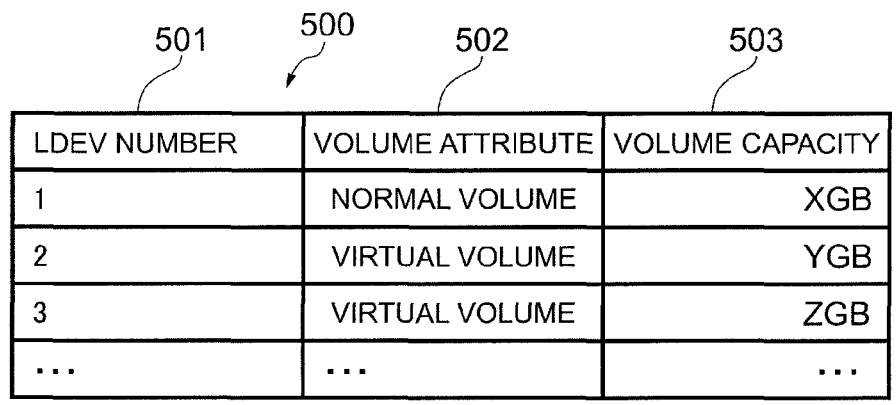
FIG. 5 is a configuration diagram of a management table for managing correspondence relationships between LDEV numbers, volume attributes and volume capacity.

FIG. 5 shows a configuration of a management table 500 for managing correspondence relationships between the LDEV numbers and volume attributes.

The management table 500 comprises an LDEV number field 501, a volume attribute field 502, and a volume capacity field 503. The LDEV number is a number for uniquely identifying the LDEV 322 in the storage apparatus 101 and each entry in the LDEV number field 501 stores a number which corresponds to an LDEV 322. Where volume attributes are concerned, the volume attribute of the LDEV 322 specifies whether the volume is a normal volume or virtual volume, and each entry of the volume attribute field 502 stores the name of a normal volume or a virtual volume.

When the volume attribute of the LDEV 322 is a normal volume, this indicates that the LDEV 322 is a volume that comprises a real storage area in one or more disks 132.

The volume capacity is the maximum capacity of data which can be stored in a normal volume or virtual volume and each entry in the volume capacity field 503 stores a numerical value for the capacity of the normal volume or virtual volume.

Figure 6:
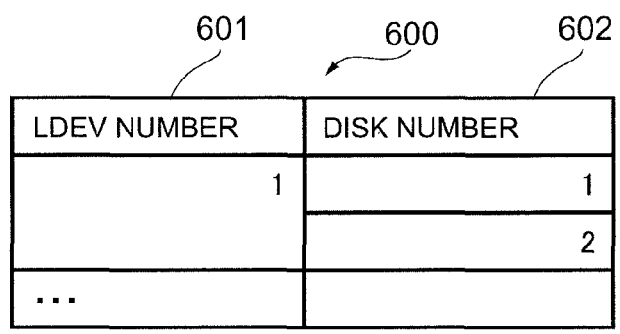
FIG. 6 is a configuration diagram of a management table for managing correspondence relationships between LDEV numbers and disk numbers.

FIG. 6 shows a configuration of a management table 600 for managing correspondence relationships between the LDEV numbers and disk numbers.

The management table 600 is a management table for when the volume attribute of the LDEV 322 is a normal volume and comprises an LDEV number field 601 and disk number field 602. The LDEV number is a number for uniquely identifying the LDEV 322 in the storage apparatus 101 and each entry in the LDEV number field 601 stores a number which corresponds to an LDEV 322. The disk number is a number for uniquely identifying the disks 132 in the storage apparatus 101 and the entries in the disk number field 602 each store the numbers of the disks 132 which the LDEV 322 comprises.

FIG. 7 shows a configuration of a management table 700 for managing correspondence relationships between the LDEV numbers and pool numbers.

The management table 700 is a management table for when the volume attribute of the LDEV 322 is a virtual volume and comprises an LDEV number field 701 and pool number field 702. The LDEV number is a number for uniquely identifying the LDEV 322 in the storage apparatus 101 and each entry in the LDEV number field 701 stores a number which corresponds to an LDEV 322. The pool number is a number for uniquely identifying the pools 323 in the storage apparatuses 101 and each entry in the pool number field 702 stores a number of a pool 323 which corresponds to an LDEV 322.

FIG. 8 shows a configuration of a management table 800 for managing correspondence relationships between the pool numbers and disk numbers.

The management table 800 is a management table for when the volume attribute of the LDEV 322 is a virtual volume and comprises a pool number field 801 and disk number field 802. The pool number is a number for uniquely identifying the pools 323 in the storage apparatuses 101 and each entry in the pool number field 801 stores a number which corresponds to a pool 323. The disk number is a number for uniquely identifying the disks 132 in the storage apparatus 101 and the entries in the disk number field 602 each store the numbers of the disks 132 from which real storage area has been assigned to the pool 323.

Embodiment 1

This embodiment is configured such that data parts and control information parts are stored in different areas and if only the data parts are read/written from the disk, the storage controller is able to position the disk head directly at the data part, dispensing with the processing to skip the position of the control information part.

Here, user data areas where data parts are placed and control information areas which are storage areas disposed successively to the user data areas and in which control information parts are disposed are managed as storage areas which are targeted for changes in capacity, for example storage areas when expanding or reducing capacity, and as the storage areas, volumes (LDEV) in which user data areas and control information areas lie side by side (first data placement) are managed as 3390-format volumes.

<Data Placement in 3390 Format LDEV 322>

Figure 9:
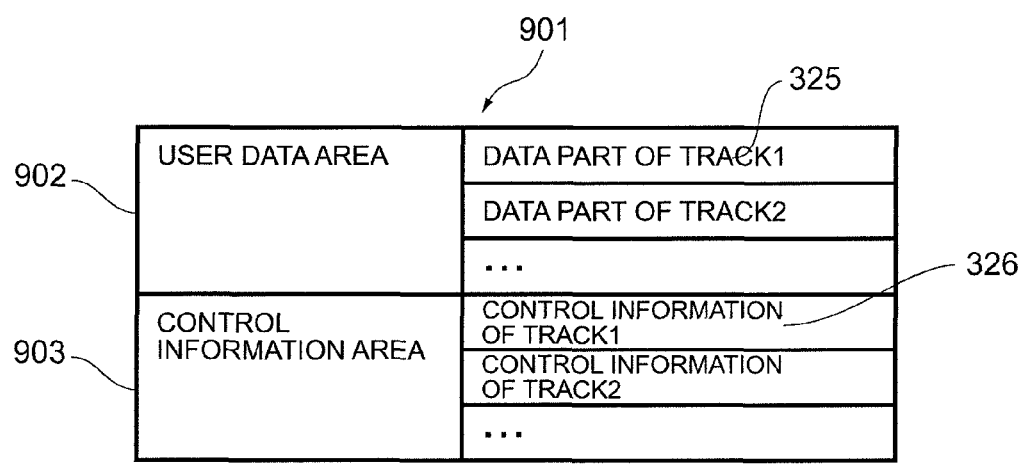
FIG. 9 is a configuration diagram illustrating data placement in a 3390-format LDEV.

FIG. 9 shows data placement in a 3390-format LDEV 322 which the HDEV 321 comprises.

In FIG. 9, the storage area 901 of the LDEV 322 comprises a user data area 902 and a control information area 903. The user data area 902 comprises a first data area for storing a plurality of data parts (including one or more records corresponding to tracks) 325, and the control information area 903 is successive to the user data area 902 and comprises a first control information area for storing control information parts 326 which comprise control information for accessing each of the data parts 325 stored in the user data area 902. Here, the storage controller 131 manages the LDEV 322 in a first volume format (also called 3390-format hereafter) in which the first data placement involves data placement of the storage area 901 in which the control information area 903 is placed successively to the user data area 902. The microprogram 231 identifies the data parts 325 in each track by means of a track number and identifies the control information part 326 in each track by means of a track number.

The 3390-format LDEV 322 is such that as the number of tracks in an HDEV 321 increases, the numbers of tracks in the user data area 902 and the control information area 903 also increase. That is, in a 3390-format LDEV 322 is such that of the number of tracks in an HDEV 321 increases as the capacity expands, the numbers of tracks in the user data area 902 and the control information area 903 also increase as the track number in the HDEV 321 increases.

For the data placement of the 3390-format LDEV 322, the control information area 903 can also be placed in front of the user data area 902.

<Example of a Write Command or Read Command with Respect to a 3390-Format LDEV 322>

Processing is described hereafter for a case where an MF host computer 102 issues a write command to the storage controller 131 via the host I/F 121. The write command parameters are the HDEV number, the track number of the write target track in the HDEV 321, and the write target data.

If a write command is received from the MF host computer 102, the command controller 251 in the storage controller 131 refers to the management table 400 based on the HDEV number which is a write command parameter, and acquires the LDEV number corresponding to the HDEV number.

The command controller 251 specifies the LDEV 322 from the acquired LDEV number, and calculates, based on the track number of the write target track, the address of the data part 325 of the specified track number on the LDEV 322 (the same track number as the track number of the write target track in the HDEV 321) and the address of the control information part 326 of the specified track number on the LDEV 322 (the same track number as the track number of the write target track in the HDEV 321).

Thereafter, the command controller 251 determines whether the aforementioned write command must refer to the control information part 326 of the track number. If it is necessary to refer to the control information part 326 of the track number, for example in a case where the MF host computer 102, as a result of referring to the control information part 326, requests that information be sent back relating to the alignment state of the head with respect to the track, the RAID controller 252 refers to the management table 600 based on the LDEV number and reads, based on the address of the control information part 326, the control information part 326 of the track number from one or more disks 132 to the cache memory 124. The command controller 251 refers to the control information part 326 of the track number which is read to the cache memory 124.

If there is no need for the command controller 251 to refer to the control information part 326 of the track number, the read processing of the control information part 326 may be omitted.

That is, if data parts 325 and control information parts 326 are stored in different areas and the sizes of the tracks storing the data parts 325 have a configured value, the command controller 251 directly positions the disk head at the data parts 325 on the disk side even without referring to the control information of the control information parts 326. In this case, processing to skip areas of control information parts 326 is unnecessary in disk head alignment, and the storage controller 131 is able to perform faster read access or write access processing than when referring to the control information part 326.

Thereafter, the command controller 251 writes write target data to the cache memory 124.

The RAID controller 252 subsequently refers to the management table 600 based on the LDEV number, acquires the disk number corresponding to the LDEV number, specifies the disk 132 comprising the LDEV 322, and based on the address of the data part 325, writes the write target data in the cache memory 124 to one or more specified disks 132. That is, if the 3390-format data placement is the same as the data placement in a real storage area, the RAID controller 252 is able to write the write target data in the cache memory 124 to one or more specified disks 132 by using the address according to the result of the calculation by the command controller 251 without using the address obtained in the address conversion by the address conversion unit 254.

Thereafter, the storage controller 131 informs the MF host computer 102 that the write command processing is complete via the host I/F 121.

Processing was described hereinabove for a case where an MF host computer 102 issues a write command to the storage controller 131 via the host I/F 121.

Processing is described hereafter for a case where an MF host computer 102 issues a read command to the storage controller 131 via the host I/F 121. The read command parameters are the HDEV number and the track number of the read target track in the HDEV 321.

If a read command is received from the MF host computer 102, the command controller 251 in the storage controller 131 refers to the management table 400 based on the HDEV number which is a read command parameter, and acquires the LDEV number corresponding to the HDEV number.

The command controller 251 specifies the LDEV 322 from the acquired LDEV number, and calculates, based on the track number of the read target track (the same track number as the track number of the read target track in the HDEV 321), the address of the data part 325 of the specified track number on the LDEV 322 and the address of the control information part 326 of the track number on the read target track (the same track number as the track number of the read target track in the HDEV 321).

Thereafter, the command controller 251 determines whether the aforementioned read command must refer to the control information part 326 of the track number. If it is necessary to refer to the control information part 326 of the track number, the RAID controller 252 refers to the management table 600 based on the LDEV number and reads, based on the address of the control information part 326, the control information part 326 of the track number from one or more disks 132 to the cache memory 124. The command controller 251 refers to the control information part 326 of the track number which is read to the cache memory 124. If there is no need to refer to the control information part 326 of the track number 942, the read processing of the control information part 326 may be omitted.

The RAID controller 252 subsequently refers to the management table 600 based on the LDEV number, acquires the disk number corresponding to the LDEV number and specifies the disk 132, and based on the address of the data part 325, reads the data part of the track number of the read target track to the cache memory 124 from one or more specified disks 132.

Thereafter, the storage controller 131 transmits a data part 325, in the cache memory 124, which has the track number of the read target track to the MF host computer 102 via the host I/F 121.

Processing was described hereinabove for a case where an MF host computer 102 issues a read command to the storage controller 131 via the host I/F 121.

In the processing in response to a read command, if the data part 325 or control information part 326 of the track number of the read target track already exists in the cache memory 124, the processing can be omitted in which the data part 325 or control information part 326 of the track number of the read target track is read to the cache memory 124 from one or more disks 132.

Also, in the processing in response to a read command, because the disk head can be directly aligned at the data part 325 without the command controller 251 referring to the control information of the control information part 326, the storage controller 131 is able to expedite read access or write access processing because the processing to skip the control information part 326 is unnecessary when the control information part 326 is not referred to.

<Capacity Expansion of the 3390 Format LDEV 322>

FIG. 10 shows an example of when capacity expansion is carried out on the 3390-format LDEV 322.

If a need arises to change the capacity of the 3390-format LDEV 322, for example if a need arises to expand the capacity of the 3390 format LDEV 322 shown in FIG. 9, the access request source can be identified with the access target volume serving as the 3390-format volume and the command controller 251, and data placement is adopted in which a control information area is formed successive to a user data area so that the command controller 251 is able to access the LDEV 322 as a 3390 format LDEV 322 even after capacity expansion.

More specifically, the storage area 910 of the 3390 format LDEV 322 after capacity expansion comprises distributed user data areas 1001 and 1002, and distributed control information areas 1011 and 1012.

In other words, the storage area of the LDEV 322 before capacity expansion comprises distributed user data area 1001 and distributed control information area 1011, and if a distributed user data area 1002 and a distributed control information area 1012 are added to the storage area, data placement (data placement according to the 3390 format) is carried out such that the distributed user data area 1002 is placed as a newly secured user data area 1002 successively to the distributed user data area 1001, the distributed control information area 1011 is placed successively to the distributed user data area 1002, and the distributed control information area 1012 is placed as a newly secured storage area successively to the distributed control information area 1011, and taking the storage area 910 as a whole, the control information area is formed successively to the user data area.

However, the real storage area 920 constructed on the disk 132 is formed by the distributed user data area 1001, the distributed control information area 1011, the distributed user data area 1002, and the distributed control information area 1012 in that order.

In other words, the storage area of the real storage area before capacity expansion comprises the distributed user data area 1001 and the distributed control information area 1011, and if a distributed user data area 1002 and a distributed control information area 1012 are added to the storage area, data placement is carried out such that the distributed user data area 1002, which is a newly secured storage area, is placed successively to the distributed control information area 1011, and the distributed control information area 1012, which is a newly secured storage area, is placed successively to the distributed user data area 1002.

Here, if the configuration controller 253 in the microprogram 231 receives a capacity expansion instruction from the management host computer 103 via the management host I/F 127, a newly secured real storage area is formed as a real storage area which is successive to the distributed control information area 1011, and the distributed user data area 1002 and the distributed control information area 1012 are placed successively to the real storage area.

The distributed user data areas 1001 and 1002 and the distributed control information areas 1011 and 1012 can have the same configuration as the user data area 902 and control information area 903 in the storage area 901 in FIG. 9.

The data placement for a real storage area comprising two areas, namely the distributed user data area 1001 and distributed control information area 1011 in the real storage area 920 is 3390-format data placement, and the data placement for a real storage area comprising two areas, namely the distributed user data area 1002 and distributed control information area 1012 is 3390-format data placement. That is, there are two classes of 3390-format data placement in the real storage area 920.

The size of the distributed user data area 1002 is determined by the expansion capacity designated on the management screen of the management host computer 103 and is an integer multiple of the aforementioned track size, and so on.

The ratio between the size of the distributed user data area 1001 and the size of the distributed control information area 1011 is equal to the ratio between the size of the distributed user data area 1002 and the size of the distributed control information area 1012.

Furthermore, the track number of the data part 325 indicated by an address 1021 in the distributed user data area 1002 placed in the storage area 910 is equal to the track number of the data part 325 indicated by the address 1022 in the distributed user data area 1002 placed in the real storage area 920.

In FIG. 10, data is placed in the real storage area 920 after capacity expansion, namely the distributed user data area 1001, the distributed control information area 1011, the distributed user data area 1002, and the distributed control information area 1012 in that order (hereinafter data placement will sometimes be referred to as data placement in a real storage area.).

In cases where data placement of the storage area 910 to which the command controller 251 refers differs from the data placement of the real storage area 920, the address (hereinafter also called the data address) 1021 indicated by the data part 325 of the track number in the storage area 910, which is 3390-format data placement, and the address (hereinafter sometimes also called the data address) 1022 indicated by the data part 325 of the track number in the real storage area 920, which is data placement in a real storage area, have different address values in each distributed user data area 1002 despite having the same track number. Therefore the address conversion unit 254 in the microprogram 231 executes address conversion for converting the address 1021 indicating the data part 325 of the track number in the distributed user data area 1002 of the storage area 910, for example, into the address 1022 indicating the data part 325 of the track number in the real storage area 920.

Likewise, the address conversion unit 254 in the microprogram 231 performs address conversion for converting an address (hereinafter sometimes also referred to as the control information address) indicating the control information part 326 of the track number in the storage area 910 in 3390 format data placement into an address (hereinafter sometimes also referred to as the control information address) indicating the control information part 326 of the track number of the real storage area 920 which is data placement in the real storage area.

Even after capacity expansion of the LDEV 322, the command controller 251 is able to access a volume according to data placement in the real storage area as a 3390 format volume by using an address obtained through the address conversion by the address conversion unit 254.

<Address Conversion Processing of the Address 1021 in 3390 Format Data Placement and of the Address 1022 in Data Placement in the Real Storage Area>

FIG. 11 shows a configuration of a management table 1100 for managing the sizes of distributed user data areas and distributed control information areas.

In FIG. 11, the management table 1100 is a table stored in the main memory 123 or cache memory 124 and which comprises an ifield 1101, a size field 1102 of a distributed user data area i, and a size field 1103 of a distributed control information area i. A number identifying the distributed user data area and distributed control information area is stored in each entry of the ifield 1101. The sizes of the distributed user data areas 1001 and 1002 are stored as numerical values (150, 100), for example, in each entry of the distributed user data area i size field 1102. The sizes of the distributed control information areas 1011 and 1012 are stored as numerical values (15, 10), for example, in each entry of the distributed control information area i size field 1103.

Information relating to the sizes of the distributed user data area and the distributed control information area is added to the entries of the management table 1100 each time capacity expansion of the aforementioned 3390 format volume is carried out.

The sizes of the distributed user data areas and the sizes of the distributed control information areas in each entry of the management table 1100 in FIG. 11 are not fixed. However, the ratio between the sizes of the distributed user data areas and the sizes of the distributed control information areas in each entry of the management table 1100 is constant.

FIG. 12 shows a configuration of a management table 1200 for managing the addresses of distributed user data areas and distributed control information areas.

In FIG. 12, the management table 1200 comprises an ifield 1201, a distributed user data area i start address field (3390 format) 1202, a distributed user data area i start address field (data placement in the real storage area) 1203, a distributed control information area i start address field 1204, and a distributed control information area i start address field (data placement in real storage area) 1205, and the management table 1200 is stored in the main memory 123 or cache memory 124, and so on.

A number identifying the distributed user data area and distributed control information area is stored in each entry of the ifield 1201. The start addresses of the distributed user data areas 1001 and 1002 in the storage area 910 are stored as numerical values (0, 150), for example, in each entry of the distributed user data area i start address field 1202. The start addresses of the distributed user data areas 1001 and 1002 in the real storage area 920 are stored as numerical values (0, 165), for example, in each entry of the distributed user data area i start address field 1203.

The start addresses of the distributed control information areas 1011 and 1012 in the storage area 910, for example, are stored as numerical values (250, 265), for example, in each entry of the distributed control information area i start address field 1204. The start addresses of the distributed control information areas 1011 and 1012 in the real storage area 920, for example, are stored as numerical values (150, 165), for example, in each entry of the distributed control information area i start address field 1205.

Information relating to the start addresses of the distributed user data area and the distributed control information area is added to the entries of the management table 1200 each time capacity expansion of the aforementioned 3390 format volume is carried out.

Figure 13:
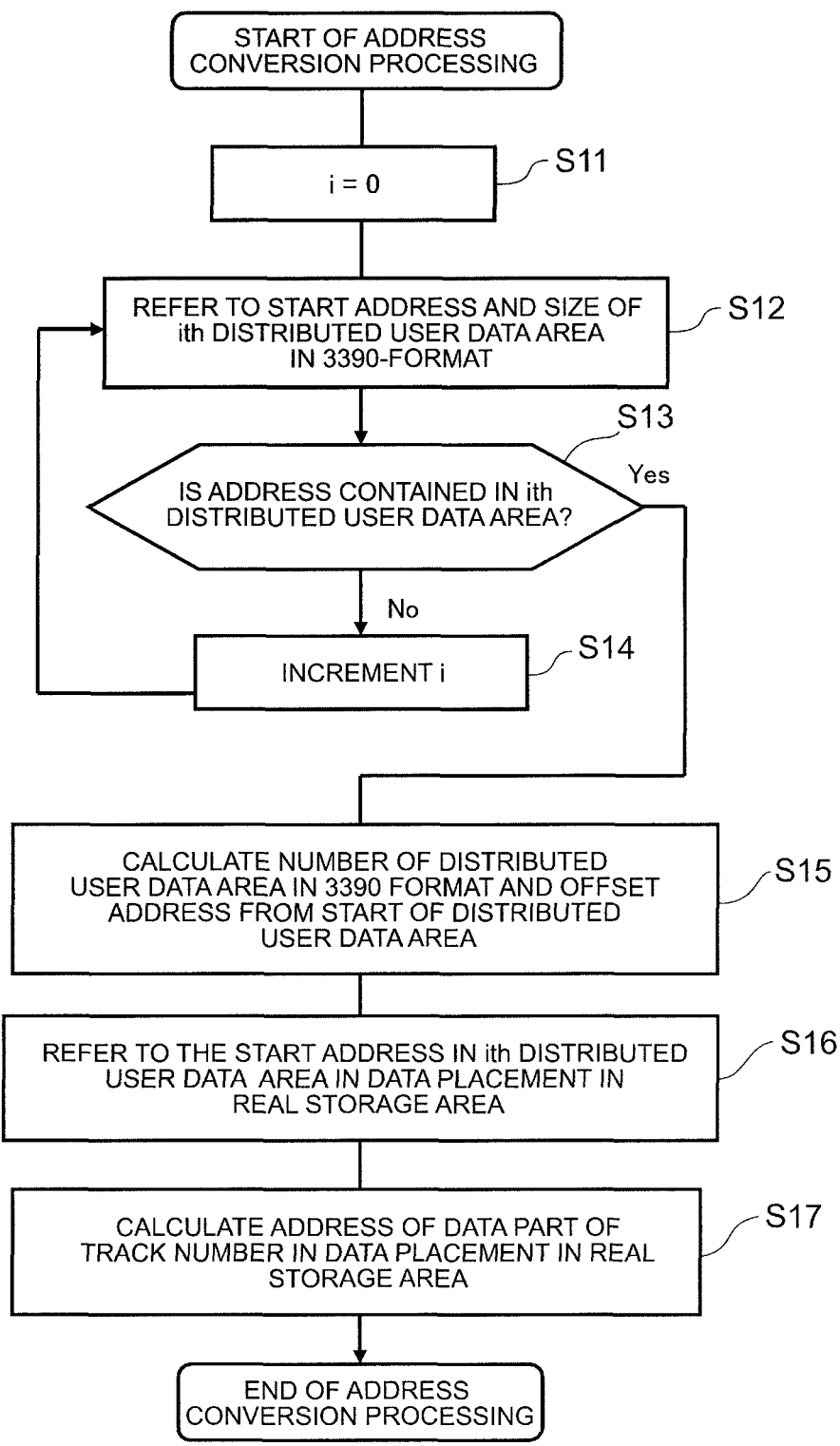
FIG. 13 is a flowchart illustrating address conversion processing in a first embodiment.

Processing for calculating an address indicating the data part 325 of the track number for data placement in the real storage area 920 from an address indicating the data part 325 of the track number in the aforementioned 3390 format data placement will be described next in accordance with the flowchart in FIG. 13.

At first, the address conversion unit 254 in the microprogram 231 sets i to 0 (S11) and refers to the management tables 1100 and 1200 to acquire information relating to the start address and size of the 0th (ith) distributed user data area in 3390 format (S12), and then determines whether or not the address 1021 in the distributed user data area 1002 in the storage area 910, for example, is included in the 0th (ith) distributed user data area (S13), and when a negative determination result is obtained in step S13, the address conversion unit 254 increments i (for example, sets i to 1) (S14), and repeats the processing of S12 to S14 until an affirmative determination result is obtained in step S13.

If an affirmative determination result is obtained in step S13, for example if the address 1021 in the distributed user data area 1002 in the storage area 910 is contained in the second distributed user data area 1002, the address conversion unit 254 calculates the number (2) of the distributed user data area 1002 in which the address 1021 is contained, and an offset address from the start address of the distributed user data area 1002 to the address 1021 on the basis of the sizes of each of the distributed user data area and distributed control information area stored in the management table 1100, the addresses of each of the distributed user data area and distributed control information area stored in the management table 1200, and the address 1021 indicating the data part 325 with a track number in the 3390-format data placement (S15).

The address conversion unit 254 subsequently refers to the management table 1200 on the basis of the addresses of the distributed user data area and distributed control information area, the number (2) of the distributed user data area 1002, and acquires the start address of the distributed user data area 1002 indicated by the number (2) of the distributed user data area 1002 (the start address of the distributed user data area 1002 in the real storage area 920) (S16).

Finally, the address conversion unit 254 calculates the address 1022 indicating the data part 325 of the track number in the real storage area 920 on the basis of the start address of the distributed user data area 1002 in the real storage area 920 and an offset address from the start address in the storage area 910 to the address 1021 (S17).

By executing the aforementioned processing, the address conversion unit 254 is able to convert the address 1021 indicating the data part 325 of the track number in 3390 format data placement into an address 1022 indicating the data part 325 of the track number in data placement in the real storage area 920.

Furthermore, by executing the same processing as the processing to convert the address 1021 into the address 1022, the address conversion unit 254 is able to calculate an address indicating the control information part 326 of the track number in the real storage area 920 from an address indicating the control information part 326 of the track number 1031 in 3390 format data placement.

According to this embodiment, by skipping the control information part 326 of the track, the overhead of processing to align the disk head with the data part 325 is reduced, and therefore the storage controller 131 is able to improve the read-access or write access performance with respect to the disk over and above the performance when the track control information part 326 is referred to.

Furthermore, according to this embodiment, even if the capacity of the 3390 format storage area 910 is expanded, the address 1021 indicating the data part 325 of the track number in 3390 format data placement can be converted into an address 1022 indicating the data part 325 of the track number for data placement in the real storage area 920 and the address indicating the control information part 326 of the track number in 3390 format data placement can be converted into an address indicating the control information part 326 of the track number in the real storage area 920.

Even after capacity expansion of the LDEV 322, which is 3390 format data placement, the command controller 251 is able to access a volume according to data placement in the real storage area as a 3390 format volume by using an address obtained through the address conversion by the address conversion unit 254.

Embodiment 2

This embodiment creates one cylinder group (CG) from one distributed user data area (second data area) and one distributed control information area, groups together a plurality of cylinder groups, and manages the cylinder groups as capacity expansion unit storage areas, and as the storage areas, manages volumes, for which data placement (second data placement) is adopted in which a plurality of cylinder groups form a line, as second volume format (hereinafter also referred to as 3390-A format) volumes (LDEV 322), and converts addresses pertaining to 3390-format volumes to addresses pertaining to 3390-A format volumes.

<Data Placement in 3390-A Format LDEV 322>

Figure 14:
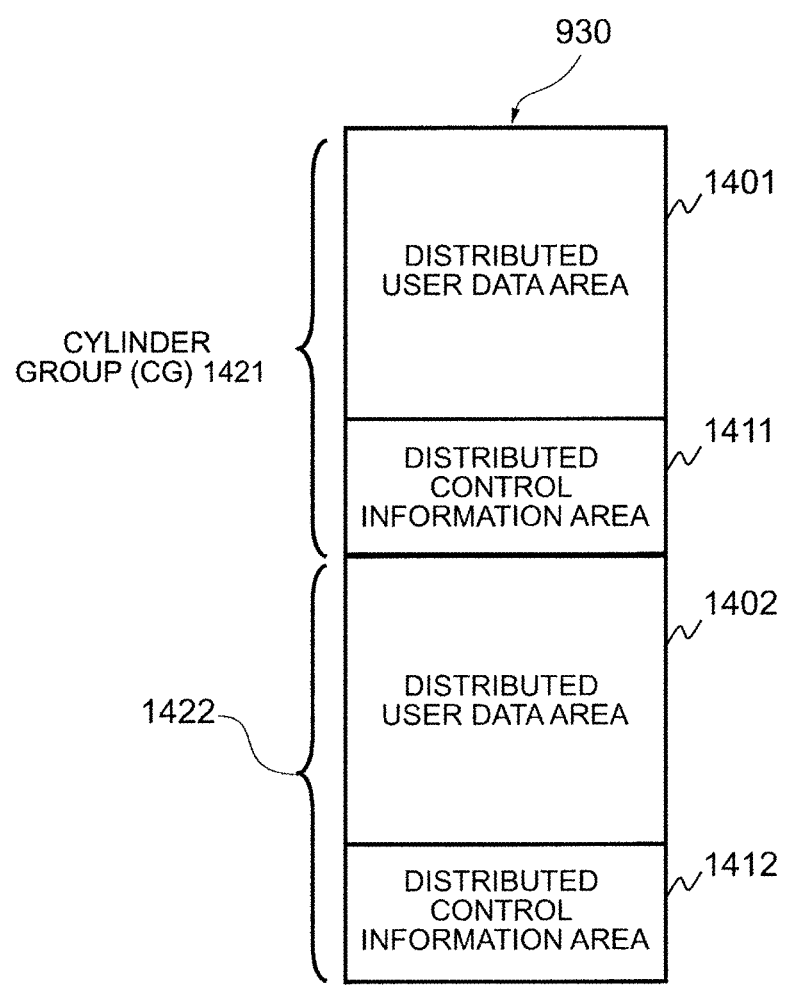
FIG. 14 is a configuration diagram illustrating data placement in a 3390-A format LDEV.

FIG. 14 shows data placement in a 3390-format LDEV 322.

In FIG. 14, the real storage area 930 of the LDEV 322 comprises a cylinder group (CG) 1421 which includes a distributed user data area 1401 and a distributed control information area 1411 which is placed successively to the distributed user data area 1401, and a cylinder group (CG) 1422 which includes a distributed user data area 1402 and a distributed control information area 1412 which is placed successively to the distributed user data area 1402. The distributed user data areas 1401 and 1402 are each of the same size and the distributed control information areas 1411 and 1412 are also of the same size. That is, the cylinder groups (CG) 1411 and 1422 each comprise the same size and the capacities of the cylinder groups are the units of capacity expansion.

Here, the storage controller 131 manages, for example, the LDEV 322 in a second volume format (also called 3390-A format hereafter) in which the second data placement involves data placement of the real storage area 930 in which the distributed control information area (second control information area) 1411 is placed successively to the distributed user data area (second data area) 1401, these storage areas forming the cylinder group (CG) 1421.

The one or plurality of CG 1421 which the 3390-A format LDEV 322 comprises may also be referred to by their CG number. The one or plurality of distributed user data areas 1401 which the LDEV 322 comprises may also be referred to by the number of the distributed user data area (described subsequently). The one or plurality of distributed control information areas 1411 which the LDEV 322 comprises may also be referred to by the number of the distributed control information area (described subsequently).

Figure 15:
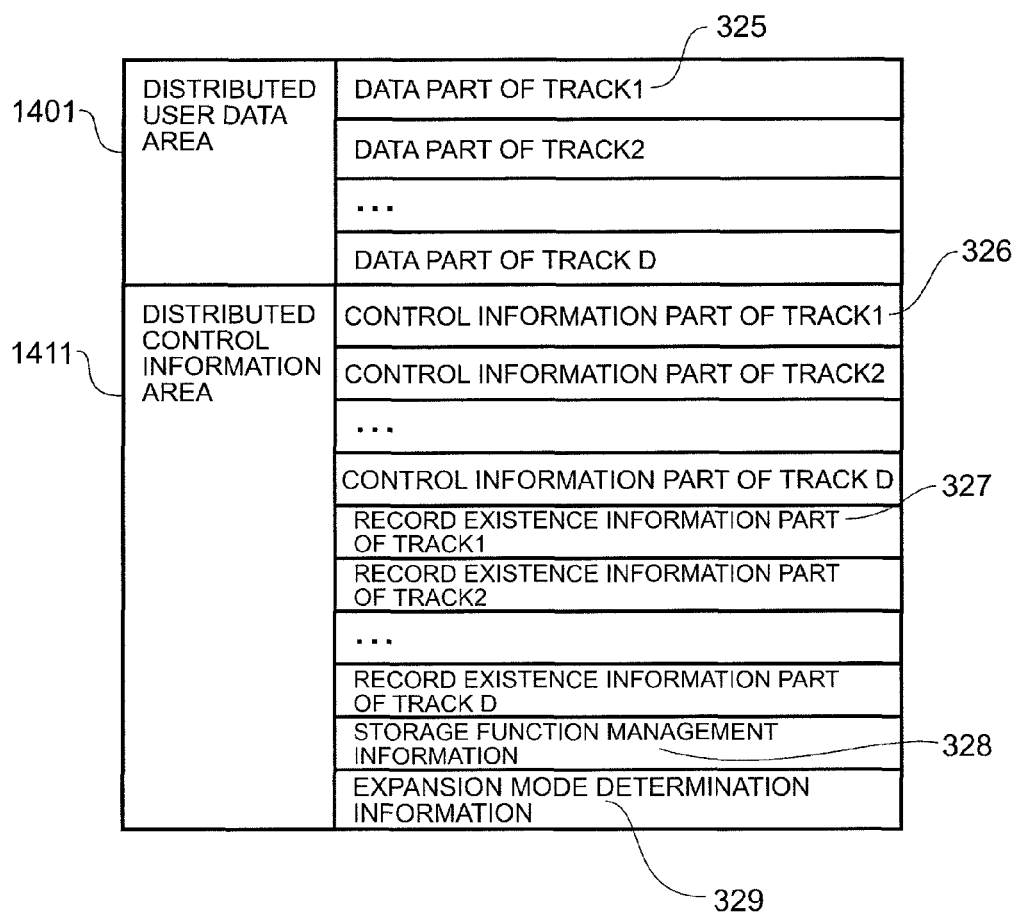
FIG. 15 is a configuration diagram illustrating configuration in a cylinder group.

FIG. 15 shows the configuration in the cylinder group 1421.

The cylinder group (CG) 1421 comprises the distributed user data area 1401 and the distributed control information area 1411. The distributed user data area 1401 comprises a second data area for storing a plurality (D) of data parts (including one or more records corresponding to tracks 1 to D) 325.

The distributed control information area 1411 is placed successively to the distributed user data area 1401 and comprises a plurality (D) of control information parts 326 which comprise control information for accessing each of the data parts 325 stored in the distributed user data areas 1401, a plurality (D) of record existence information parts 327 comprising record existence information indicating whether a record exists in each track of each data part 325, storage function management information 328 with which the storage controller 131 manages the LDEV 322, and a second control information area in which the storage controller 131 stores expansion mode determination information 329 for determining whether or not a mode for expanding cylinder groups exists.

Here, the microprogram 231 identifies the data parts 325 in each track by means of a track number and identifies the control information part 326 in each track by means of a track number.

The control information parts 326 and the record existence information parts 327 can also comprise bitmaps, and so on. One or more records are saved in the data parts 325 of each track. The records are write data and so forth from the MF host computers 102, and so on.

In addition, in each of the cylinder groups 1421 and 1422, the number (D) of data parts 325 of the tracks in the distributed user data areas 1401 and 1402, the number (D) of control information parts 326 of the tracks in the distributed control information areas 1411 and 1412, and the number (D) of record existence information parts 327 of the tracks in the distributed control information areas 1411 and 1412 are equal.

FIG. 16 shows correspondence between addresses in a 3390 format LDEV 322 and addresses in a 3390-A format LDEV 322.

In FIG. 16, the storage area 910 of the 3390 format LDEV 322 comprises the distributed user data areas 1401, 1402, and 1403 and distributed control information areas 1411, 1412, and 1413, and the real storage area 930 of the 3390-A format LDEV comprises the cylinder group 1421 which includes the distributed user data area 1401 and distributed control information area 1411, the cylinder group 1422 which includes the distributed user data area 1402 and distributed control information area 1412, and the cylinder group 1423 which includes the distributed user data area 1403 and distributed control information area 1413.

3390-format volume data placement is in the order of the distributed user data area 1401, the distributed user data area 1402, the distributed user data area 1403, the distributed control information area 1411, the distributed control information area 1412, and the distributed control information area 1413, and 3390-A format volume data placement is in the order of the cylinder group 1421, cylinder group 1422, and cylinder group 1423.

In cases where a different structure is adopted for 3390 format volume data placement and 3390-A format data placement, an address indicating a data part 325 with a track number in the storage area 910, which is 3390-format data placement, and an address indicating a data part 325 with a track number in the real storage area 930, which is 3390-A data placement, have different address values in each distributed user data area and each distributed control information area despite having the same track number. Therefore the address conversion unit 254 in the microprogram 231 executes address conversion for converting the address 1031 indicating the data part 325 of the track number in the distributed user data area 1403 of the storage area 910, for example, into the address 1032 indicating the data part 325 of the track number in the real storage area 930.

Likewise, the address conversion unit 254 in the microprogram 231 performs address conversion for converting an address indicating the control information part 326 of the track number in the storage area 910 in 3390 format data placement into an address indicating the control information part 326 of the track number in the real storage area 930 which is 3390-A format data placement.

The command controller 251 is able to access an LDEV 322 according to 3390-A format data placement in the real storage area as a 3390 format LDEV 322 by using an address obtained through the address conversion by the address conversion unit 254. That is, despite accessing the LDEV 322 of 3390 format data placement, the command controller 251 is able to access the data part 325 in the real storage area as a result of conversion by the address conversion unit 254 of the address in the LDEV 322 of 3390 format data placement to the address of the LDEV 322 according to 3390-A format data placement.

<Capacity Expansion of the 3390-A Format LDEV 322>

FIG. 17 shows a configuration of a management table 1700 for managing the sizes of distributed user data areas and distributed control information areas.

In FIG. 17, the management table 1700 is a table for managing a 3390-A format LDEV 322, the table 1700 comprising a distributed user data area length field 1701 and a distributed control information area length field 1702, and being stored in the main memory 123 or cache memory 124, and so on. The entries of the distributed user data area length field 1701 store information, as numerical values, which indicates the common lengths of each distributed user data area. The entries of the distributed control information area length field 1702 store information, as numerical values, which indicates the common length of each distributed control information area.

FIG. 18 shows a configuration of a management table 1800 for managing the addresses of distributed user data areas and distributed control information areas.

In FIG. 18, the management table 1800 comprises an ifield 1801, a start address field of the distributed user data area i (3390 format) 1802, a start address field of the distributed user data area i (3390-A format data placement) 1803, a start address field of the distributed control information area i 1804, and a start address field of the distributed control information area i (3390-A format data placement) 1805, and the management table 1800 is stored in the main memory 123 or cache memory 124, and so on.

A number identifying the distributed user data area and distributed control information area is stored in each entry of the ifield 1201. The start addresses of the distributed user data areas 1401 and 1002 in the storage area 910 are stored as numerical values (0, 100), for example, in each entry of the start address field of the distributed user data area i 1802. The start addresses of the distributed user data areas 1401 and 1402 in the real storage area 930 are stored as numerical values (0, 150), for example, in each entry of the start address field of the distributed user data area i 1803.

The start addresses of the distributed control information areas 1411 and 1412 in the storage area 910 are stored as numerical values (500, 550), for example, in each entry of the start address field of the distributed control information area i 1804. The start addresses of the distributed control information areas 1411 and 1412 in the real storage area 930 are stored as numerical values (100, 250), for example, in each entry of the start address field of the distributed control information area i 1805.

Information relating to the start addresses of each of the distributed user data areas and distributed control information areas is added to the entries of the management table 1800 each time capacity expansion of a 3390 format volume is carried out.

Figure 19:
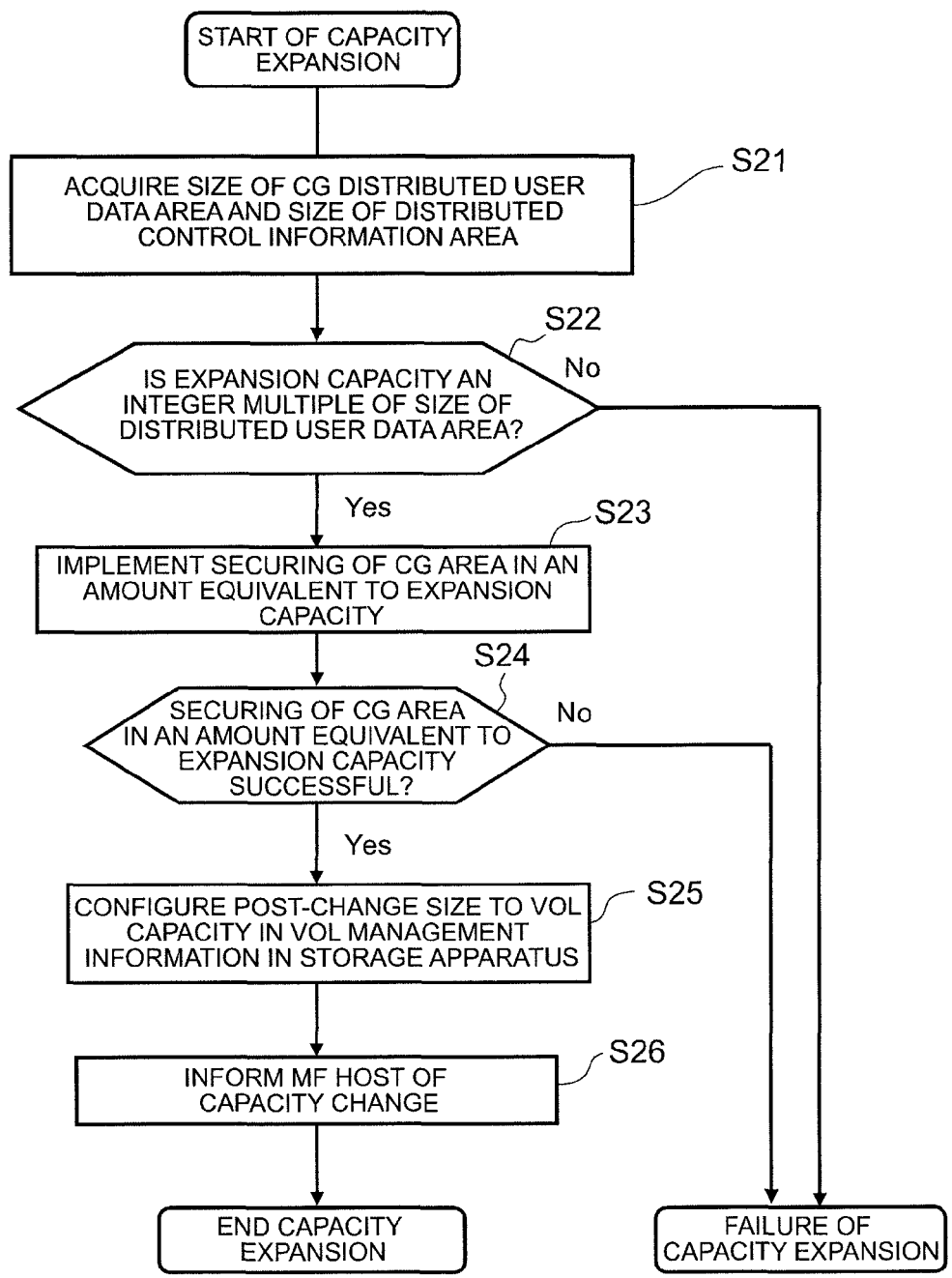
FIG. 19 is a flowchart showing capacity extension processing of a 3390-A format LDEV.

Capacity expansion processing of a 3390-A format LDEV 322 will be explained next with reference to the flowchart in FIG. 19.

When the management host computer 103 issues an capacity expansion instruction for the LDEV 322 to the configuration controller 253 via the management host I/F 127, the configuration controller 253 refers to the management table 1700 and acquires the size (100) of the distributed user data area and the size (50) of the distributed control information area (S21).

Next, the configuration controller 253 checks whether or not the expansion capacity designated by the management host 103 is an integer multiple of the size (100) of the acquired distributed user data area (S22).

If the expansion capacity designated via the management screen is not an integer multiple of the size (100) of the distributed user data area, the configuration controller 253 informs the management host computer 103 via the management host I/F 127 that the capacity expansion of the LDEV 322 has failed, and ends the capacity expansion processing.

However, if the expansion capacity is an integer multiple of the size (100) of the distributed user data area, the configuration controller 253 renders a quotient which is obtained by dividing the expansion capacity by the size (100) of the distributed user data area as the number of expansion cylinder groups, and saves this quotient in the main memory 123.

Thereafter, the configuration controller 253 secures a storage area (hereinafter also known as the expansion CG area) in which cylinder groups (CG) can be saved according to the number of expansion cylinder groups (S23). In this case, in the capacity expansion, the size of the secured expansion CG area is an integer multiple of the size of the CG which is the pre-expansion area capacity unit.

The configuration controller 253 subsequently determines whether or not the securing of the CG area corresponding to the capacity for expansion has been successful (S24), and if the expansion CG area has failed, the configuration controller 253 informs the management host computer 103, via the management host I/F 127, that capacity expansion of the LDEV 322 has failed, and ends the capacity expansion processing.

If the securing of the expansion CG area is successful, the configuration controller 253 configures the changed size to the volume capacity in the volume management information (S25), informs the MF host computer 102 via the host I/F 121 that the capacity has changed and that capacity expansion has been successful, and ends the processing of this routine.

Note that one or more distributed control information areas which exist in the expansion CG area may or may not be pre-initialized.

Furthermore, the capacity expansion instruction may be issued while the storage system, which comprises the MF host computers 102 and storage apparatuses 101, is online.

Figure 20:
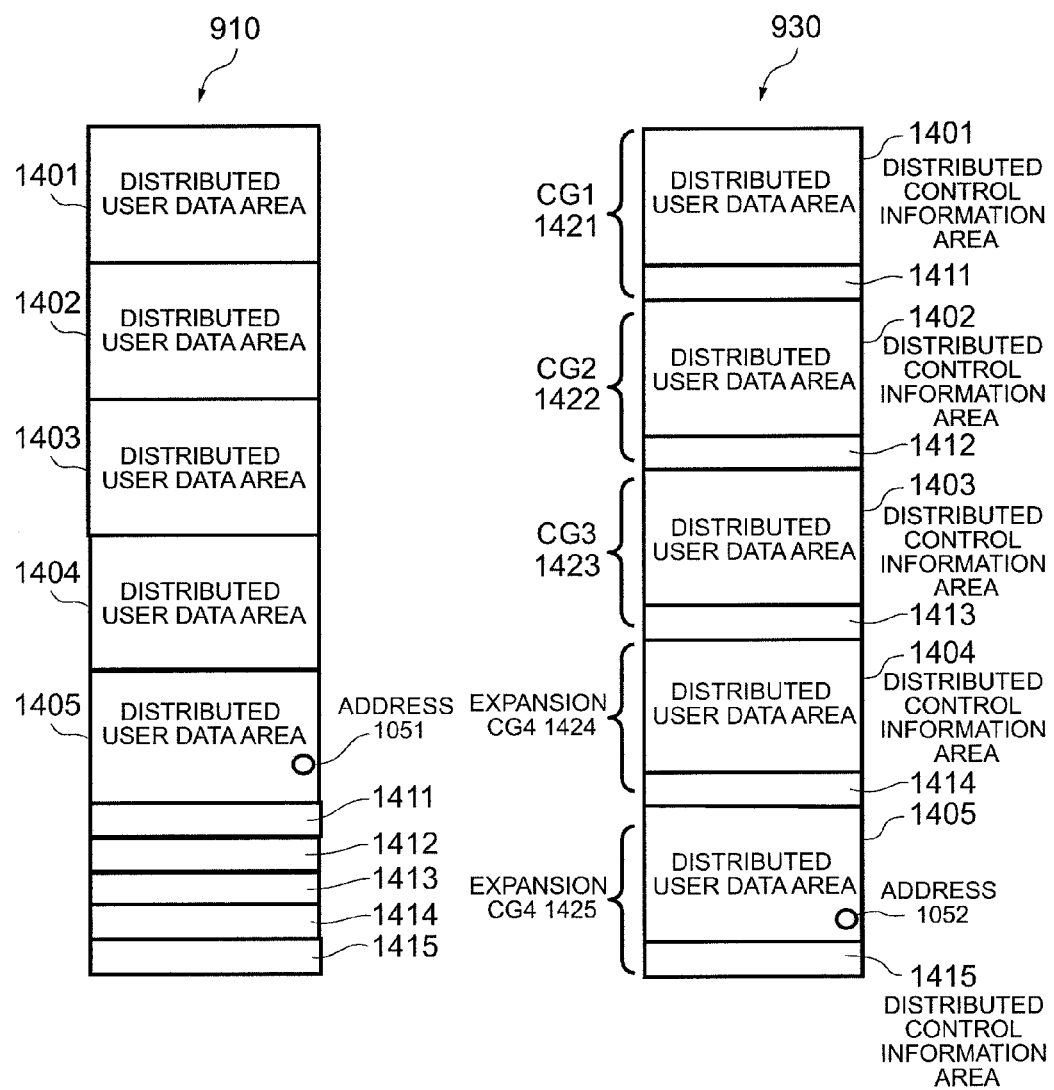
FIG. 20 is a configuration diagram illustrating correspondence relationships following capacity extension between addresses on a 3390 format LDEV and addresses on a 3390-A format LDEV.

FIG. 20 shows correspondence, after capacity expansion, between addresses in a 3390 format LDEV 322 and addresses in a 3390-A format LDEV 322.

Upon receiving a capacity expansion instruction from the management host computer 103 via the management host I/F 127, the configuration controller 253 in the microprogram 231 places the distributed user data areas 1404 and 1405 after the distributed user data area 1403 as data placement on the 3390 format LDEV 322, and places the expansion cylinder groups 1424 and 1415 as newly secured real storage area after the cylinder group 1423 as data placement on a 3390-A format LDEV 322.

In FIG. 20, the storage area 910 of the 3390 format LDEV 322 comprises the distributed user data areas 1401, 1402, 1403, 1404, and 1405 and the distributed control information areas 1411, 1412, 1413, 1414, and 1415 and the real storage area 930 of the 3390-A format LDEV comprises the cylinder group 1421 which includes the distributed user data area 1401 and distributed control information area 1411, the cylinder group 1422 which includes the distributed user data area 1402 and distributed control information area 1412, the cylinder group 1423 which includes the distributed user data area 1403 and distributed control information area 1413, the cylinder group 1424 which includes the distributed user data area 1404 and distributed control information area 1414, and the cylinder group 1425 which includes the distributed user data area 1405 and distributed control information area 1415.

3390-format volume data placement is in the order of the distributed user data area 1401, the distributed user data area 1402, the distributed user data area 1403, the distributed user data area 1404, and the distributed user data area 1405, and the distributed control information area 1411, the distributed control information area 1412, the distributed control information area 1413, the distributed control information area 1414, and the distributed control information area 1415, and 3390-A format volume data placement for the real storage area is in the order of the cylinder group (CG) 1421, cylinder group 1422, cylinder group 1423, expansion cylinder group 1424, and expansion cylinder group 1425.

In cases where a different structure is adopted for 3390 format volume data placement and 3390-A format data placement, an address indicating a data part 325 with a track number in the storage area 910, which is 3390-format data placement, and an address indicating a data part 325 with a track number in the real storage area 930, which is 3390-A data placement, have different address values in each distributed user data area and each distributed control information area despite having the same track number. Therefore the address conversion unit 254 in the microprogram 231 executes address conversion for converting the address 1051 indicating the data part 325 of the track number in the distributed user data area 1405 of the storage area 910, for example, into the address 1052 indicating the data part 325 of the track number in the real storage area 930.

Likewise, the address conversion unit 254 in the microprogram 231 performs address conversion for converting an address indicating the control information part 326 of the track number in the storage area 910 in 3390 format data placement into an address indicating the control information part 326 of the track number in the real storage area 930 which is 3390-A format data placement.

The command controller 251 is also able, after capacity expansion of 3390-A format LDEV 322, to access an LDEV 322 according to 3390-A format data placement in the real storage area as a 3390 format LDEV 322 by using an address obtained through the address conversion by the address conversion unit 254.

Figure 21:
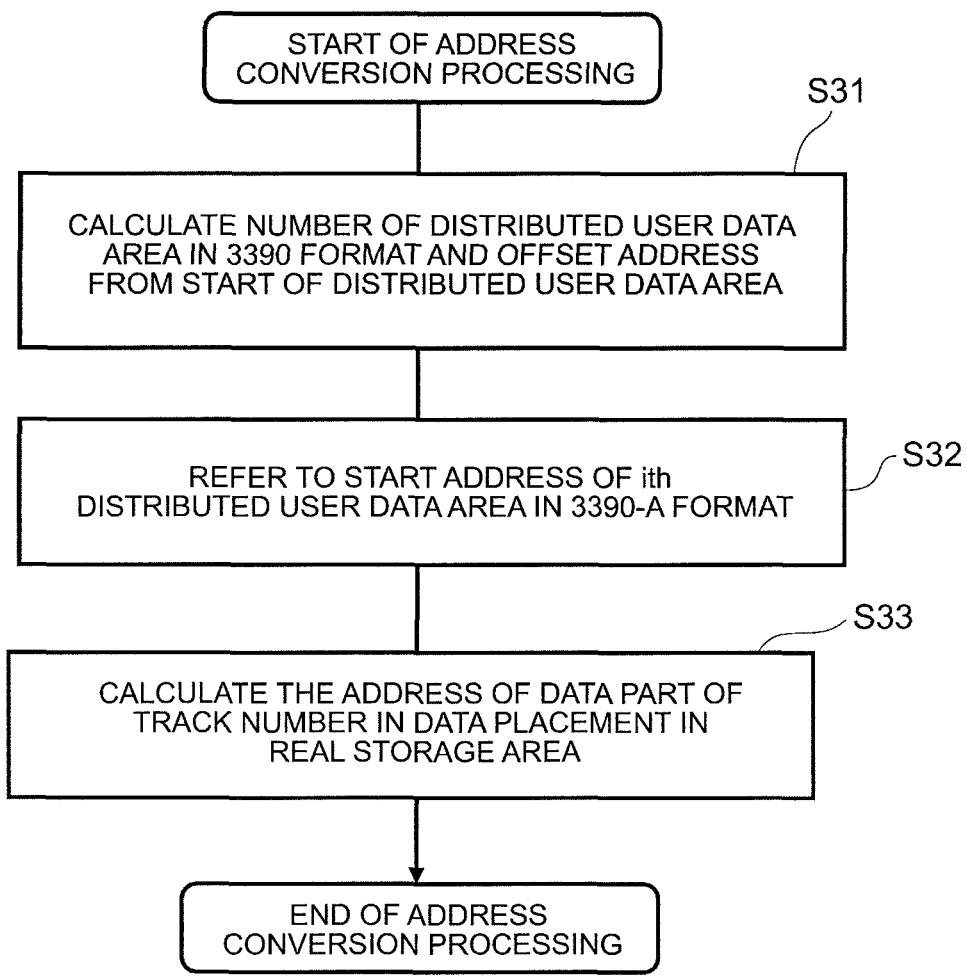
FIG. 21 is a flowchart illustrating address conversion processing in a second embodiment.

Processing for calculating the address 1052 indicating the data part of the track number on the 3390-A format volume from the address 1051 indicating the data part of the track number on the 3390 format volume will be described next in accordance with the flowchart in FIG. 21.

The address conversion unit 254 in the microprogram 231 starts the address conversion processing, and based on the address 1051 indicating the data part 325 of the track number in 3390 format data placement, refers to the management table 1700 and management table 1800, and calculates the number (5) of the 3390 format distributed user data area 1405 containing the address 1051, and an offset address from the start address (400) of the 3390-format distributed user data area 1405 to the address 1051 (S31).

The address conversion unit 254 subsequently refers to the management table 1800 on the basis of the number (5) of the 3390-format distributed user data area 1405, and the offset address from the start address (400) of the 3390-format distributed user data area 1405 to the address 1051, and acquires the start address (600) of the 3390-A format distributed user data area 1405 indicated by the number (5) of the distributed user data area 1405 (S32).

Finally, the address conversion unit 254 calculates the address 1052 indicating the data part 325 with the 3390-A format track number on the basis of the start address (600) of the acquired 3390-A format distributed user data area 1405 and the offset address from the start address (400) of the 3390 format distributed user data area 1405 to the address 1051 (S33), and ends the processing of this routine.

Likewise, the address conversion unit 254 is also able to calculate an address indicating the control information part 326 with the 3390-A format track number from an address indicating the control information part 326 of the track number in 3390 format data placement.

<Example of a Read Command with Respect to a 3390-A Format LDEV 322>

Processing is described hereafter for a case where the storage controller 131 receives a read command from an MF host computer 102 via the host I/F 121.

The command controller 251 in the microprogram 231 calculates the address of the data part 325 of the track number of the read target track in the 3390 format LDEV 322, and informs the address conversion unit 254 of the calculation result.

The address conversion unit 254 then calculates, based on the address obtained in this calculation, the address of the data part 325 and the address of the control information part 326 of a track in the real storage area, and informs the command controller 251 of these values. Here, the data placement in the real storage area of the LDEV 322 is implemented according to the 3390-A format.

If the data part 325 of the track number indicated by the address received by the command controller 251 and the control information part 326 of the track number indicated by the address received by the command controller 251 are not stored, the command controller 251 instructs the RAID controller 252 to execute data reading. The RAID controller 252 reads data corresponding to each address from one or more disks 132 via the disk I/F 125 and stores each of the data thus read in the cache memory 124.

If the data part 325 of the track number indicated by the address received by the command controller 251 and the control information part 326 of the track number indicated by the address received by the command controller 251 are stored, the command controller 251 reads the data part 325 with the track indicated by the address from the cache memory 124, and after checking the value of the control information of the track indicated by the address, transmits the data part 325 read from the cache memory 124 to the MF host computer 102 via the host I/F 121.

Processing relating to address conversion of the aforementioned read command processing can be executed in the same way for write command processing.

According to this embodiment, the command controller 251 is able, also after capacity expansion of the 3390-A format LDEV 322, to access an LDEV 322 according to 3390-A format data placement in the real storage area as a 3390 format LDEV 322 by using an address obtained through the address conversion by the address conversion unit 254.

Embodiment 3

In this embodiment, a plurality of 3390-A format volumes, which are volumes in the real storage area, are prepared, these volumes being managed in the real storage area by placing distributed user data areas in one volume and distributed control information areas in the other volume.

<System for Saving and Managing User Data Areas and Control Information Areas in Different Volumes>

Figure 22:
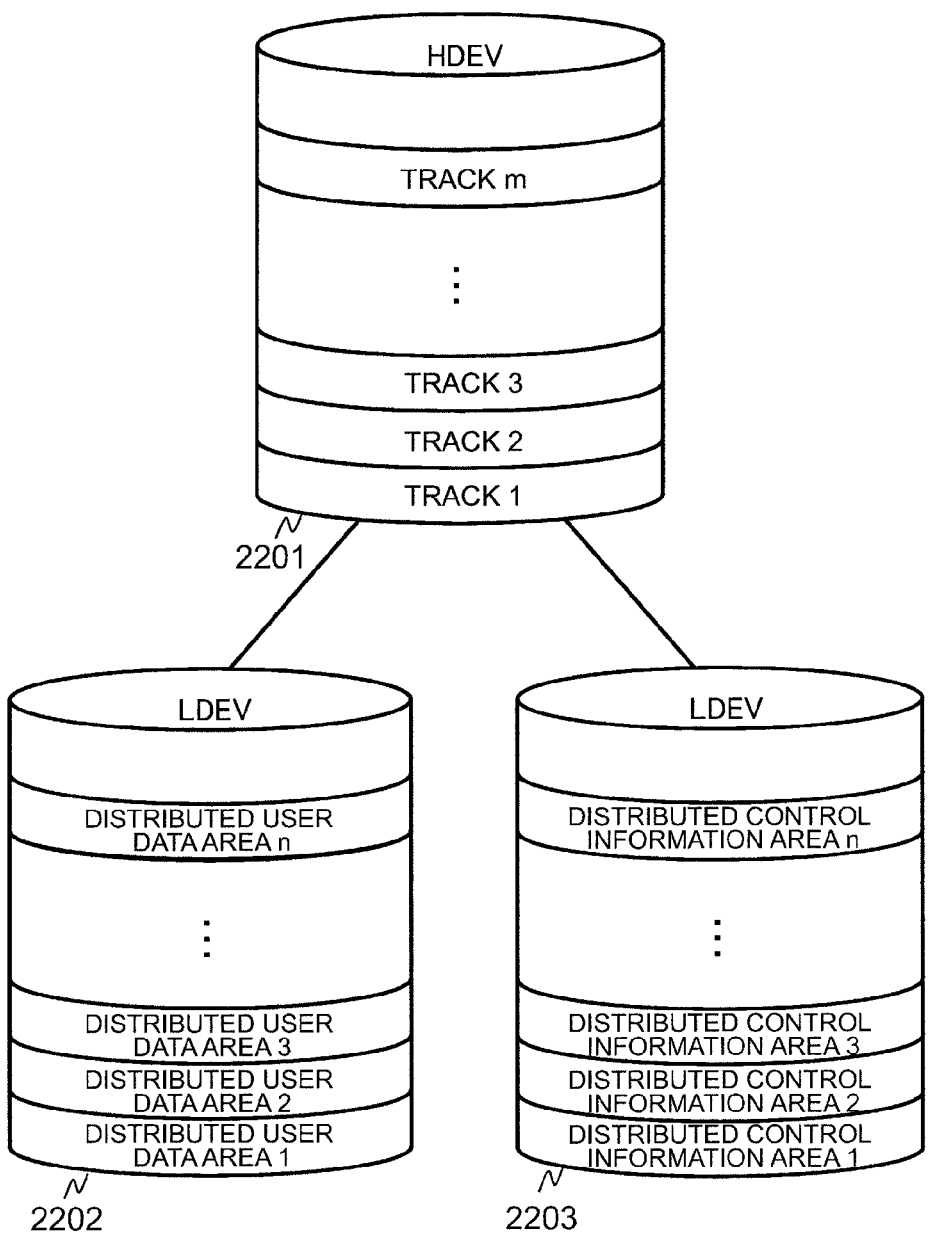
FIG. 22 is a configuration diagram illustrating the relationships between HDEV and LDEV in a third embodiment.

FIG. 22 shows an example in which the distributed user data area 1401 and distributed control information area 1411 in the cylinder group 1421 are saved and managed in different volumes.

In FIG. 22, the HDEV 2201 has the same configuration as the HDEV 321, a plurality (m) of tracks are placed in the HDEV 2201 and two LDEV 2202 and 2203 are associated. The LDEV 2202 comprises a volume for storing a plurality (n) of distributed user data areas 1401 . . . , and the LDEV 2203 comprises a volume for storing a plurality (n) of distributed control information areas 1411 . . . .

Here, in cases where the cylinder group 1421 comprises a distributed user data area 1401 and a distributed control information area 1411, the distributed user data area 1401 is placed in the LDEV 2202 and the distributed control information area 1411 is placed in the LDEV 2203 different from the LDEV 2202. The LDEV 2202 therefore comprises a large capacity and the LDEV 2203 comprises a small capacity and are compatible with volume capacity expansion.

Furthermore, for example, by combining the distributed user data area 1401 saved in the LDEV 2202 with the distributed control information area 1411 corresponding to the distributed user data area 1401 saved in the LDEV 2203, the foregoing areas may be regarded as one cylinder group. Furthermore, when one or more cylinder groups, obtained by combining each of the distributed user data areas of the LDEV 2202 and the control information areas of the LDEV 2203 which correspond to each of the distributed user data areas, are brought together, the cylinder groups may be regarded as a 3390-A format LDEV.

FIG. 23 shows a configuration of a management table 2300 for managing the addresses of distributed user data areas and distributed control information areas.

In FIG. 23, the management table 2300 comprises a distributed user data area number field 2301, an on-LDEV address field 2302, a distributed control information area number field 2303, and an on-LDEV address field 2304.

The entries of the distributed user data area number field 2301 each store the numbers of the distributed user data areas disposed in the LDEV 2202, and the entries of the on-LDEV address field 2302 each store the addresses of the distributed user data areas disposed in the LDEV 2202. The entries of the distributed control information area number field 2303 each store the numbers of the distributed control information areas disposed in the LDEV 2203, and the entries of the on-LDEV address field 2304 each store the addresses of the distributed control information areas disposed in the LDEV 2203.

Processing for a case where the MF host computer 102 performs read access to the HDEV 2201 will be explained next.

The parameters for read access by the MF host computer 102 are the HDEV number and the track number, and so on.

When the MF host computer 102 transmits a read command to the storage controller 131, the command controller 251 in the microprogram 231 refers to the HDEV 2201 according to the parameters for the read command from the MF host computer 102. Thereafter, the command controller 251 in the microprogram 231 calculates the LDEV number, the address of the data part 325 in the track on the 3390 format LDEV, and the address of the control information part 326 based on the aforementioned HDEV number and track number, and informs the address conversion unit 254.

The address conversion unit 254 refers to the management table 1700 and the management table 1800, acquires the sizes of the distributed user data area and the distributed control information area and the start addresses of the 3390-format distributed user data area and distributed control information area, calculates the LDEV number in the 3390-A format LDEV and the track number based on the acquired information, the address of the in-track data part 325, and the address of the control information part 326, and informs the command controller 251 of this LDEV number and track number.

Upon receiving a read address from the MF host computer 102 via the host I/F 121, the command controller 251 calculates, from the received track number, the number of the distributed user data area in the 3390-A format LDEV and an offset address from the start address of the distributed user data area to the data part 325 of the track number, the number of the distributed control information area in the 3390-A format LDEV, and an offset address from the start address of the distributed control information area to the control information part 326 of the track number.

The command controller 251 refers to the management table 2300 to acquire the address of the distributed user data area, and acquires an address indicating the data part 325 of the track number in the distributed user data area in the LDEV 2202 based on the acquired address, the number of the distributed user data area, and the offset address.

Furthermore, the command controller 251 refers to the management table 2300 to acquire the address of the distributed control information area, and acquires an address indicating the control information area 326 of the track number in the distributed control information area in the LDEV 2203 based on the acquired address, the number of the distributed control information area, and the offset address.

The command controller 251 subsequently performs access to the data part 325 of the read, target track in the distributed user data area, based on the acquired address.

Furthermore, the command controller 251 may refer to or update the control information part 326 of the read target track in the distributed control information area on the basis of the acquired address. Note that if it is not necessary to refer to the control information part 326 of the read target track, the processing in which the command controller 251 refers to the control information part 326 of the read target track can be omitted.

The command controller 251 transmits a data part 325 in the read target track to the MF host computer 102 via the host I/F 121.

An example of read access in a case where distributed user data areas and distributed control information areas are saved and managed in different volumes was provided hereinabove.

Note that access processing with respect to the track above can be executed in the same way also when the type of access by the MF host computer 102 is write access.

In this embodiment, a plurality of 3390-A format volumes, which are volumes in the real storage area, are prepared, these volumes being managed in the real storage area by placing user data areas in one volume and control information areas in the other volume. For this reason, a volume (LDEV 2203) in which the distributed control information areas are disposed can comprise a small capacity and a volume (LDEV 2202) in which the distributed user data areas are disposed can comprise a large capacity. In this case, even when the LDEV 2203 comprises a small capacity and the LDEV 2202 comprises a large capacity, these LDEV are compatible with volume capacity expansion.

Embodiment 4

In this embodiment, a data copy is made from the 3390 format LDEV 322 to the 3390-A format LDEV 322.

<Data Copy Processing from the 3390 Format LDEV 322 to the 3390-A Format LDEV 322>

Figure 24:
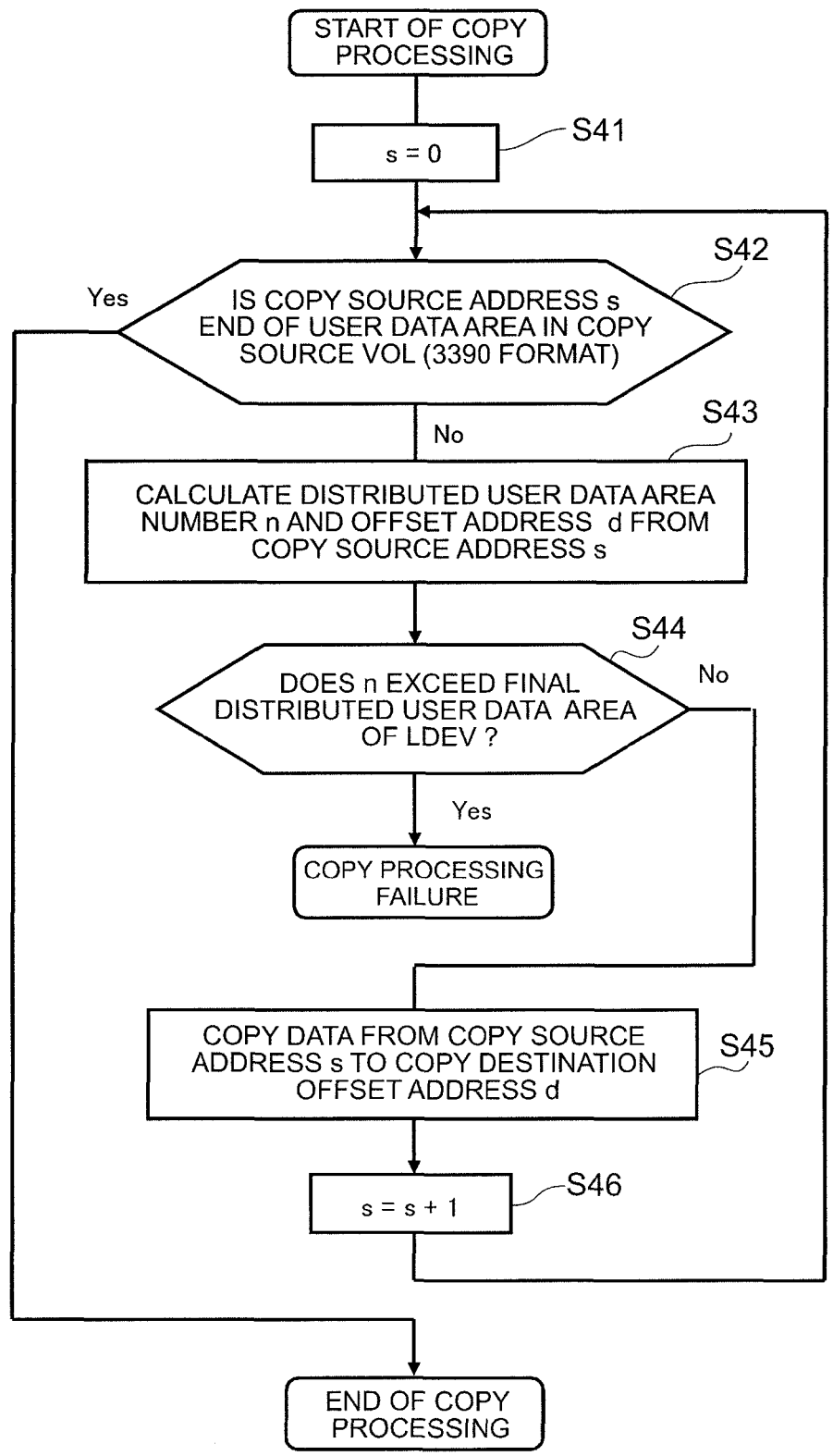
FIG. 24 is a flowchart illustrating copy processing in a fourth embodiment.

Processing to copy the data part of the track from the 3390 format LDEV 322 to the 3390-A format LDEV 322 will be explained next with reference to the flowchart in FIG. 24.

First, the following is premised on the fact that the copy-source 3390 format LDEV 322 is referenced by means of an address (s), the copy destination is the 3390-A format LDEV 322, and the 3390-A format LDEV 322 comprises one or more cylinder groups 1421. Here, the data part 325 of the track in the 3390-A format LDEV is accessed by means of a number (n) of the distributed user data area and an offset address (d) from the start address of the nth distributed user data area.

Upon receiving a copy start instruction from the management host computer 103 via the management host I/F 127, the command controller 251 in the microprogram 231 starts copy processing.

The command controller 251 configures the start address of the copy source LDEV 322 as the copy source address (s) and sets the copy source address (s) at 0 (S41).

Thereafter, the command controller 251 determines whether or not the copy source address (s) is the final address of the copy source LDEV 322 (S42) and if the copy source address (s) points to the final address of the copy source LDEV 322, the command controller 251 informs the management host computer 103 that the copy processing is complete via the management host I/F 127, and ends the copy processing.

However, if it is determined that the copy source address (s) is the final address of the copy source LDEV 322, the command controller 251 informs the address conversion unit 254 of the copy source address (s).

The address conversion unit 254 subsequently refers to the management table 1700 to acquire the size of the distributed user data area and refers to the management table 1800 to acquire the start addresses of the distributed user data area and distributed control information area, and, based on the acquired size, start address, and copy source address (s), calculates the number (n) of the distributed user data area, and the value of the offset address (d) from the start address of the copy-destination distributed user data area (n), and informs the command controller 251 of the calculation result (S43).

The command controller 251 determines whether or not the distributed user data area (n) is the final distributed user data area of the copy destination LDEV (S44), and if the distributed user data area (n) is the final distributed user data area of the copy destination LDEV, because the capacity of the copy source LDEV is greater than the capacity of the copy destination LDEV 322, the command controller 251 informs the management host computer 103 that the copy has failed via the management host I/F 127, and ends the copy processing.

However, if it is determined that the distributed user data area (n) is not a final distributed user data area of the copy destination LDEV, the command controller 251 copies the data (data part 325) from the storage area indicated by the copy source address (s) to the storage area indicated by the offset address (d) from the start address in the copy-destination distributed user data area (n) (S45).

The command controller 251 subsequently increments the copy source address (s) (s=s+1), and returns to the processing of step S32 (S46). The processing of steps S32 to S36 is subsequently repeated until an affirmative determination result is obtained in step S32.

By executing the processing of steps S41 to S46, the data part 325 in the distributed user data area 1401 in the 3390 format storage area 910, for example, can be copied into the distributed user data area 1401 in the 3390-A format real storage area 930.

Furthermore, processing to copy the control information part 326 of the track from the 3390 format LDEV 322 to the 3390-A format LDEV 322 can also be executed in the same way. In this case, the control information part 326 in the distributed control information area 1411 in the 3390 format storage area 910, for example, can be copied into the distributed control information area 1411 in the 3390-A format real storage area 930.

The volume of data copied may either be all of the data or some of the data in the copy source LDEV 322.

In the data copy processing from the 3390 format LDEV 322 to the 3390-A format LDEV 322, the distributed control information areas may be copied after finishing the copying of the distributed user data areas, or in the reverse order. In addition, some of the distributed control information area may be copied after finishing the copying of some of the distributed user data areas, and then vice versa in alternate fashion.

In addition, processing to copy data from the 3390-A format LDEV 322 to the 3390 format LDEV 322 and processing to change the address of the 3390-A format LDEV 322 to the address of the 3390 format LDEV 322 can also be executed in the same way.

According to this embodiment, by performing data copying from the 3390 format LDEV 322 to the 3390-A format LDEV 322, the data part 325 and the control information part 326 in the real storage area can be constructed from the data part 325 and the control information part 326 which belong to the 3390 format LDEV 322.

Embodiment 5

This embodiment is configured such that the LDEV 322 are managed as virtual volumes which comprise virtual storage area and such that if there is access to a virtual volume, real storage area is allocated from a pool to the virtual volume.

<Processing Relating to Real Storage Area Allocation to the Virtual Volume>

Processing which relates to the allocation of real storage area to the virtual volume includes the aforementioned address conversion processing, and page allocation processing which will be described subsequently. In the page allocation processing, the allocation of real storage area to the virtual storage area in the event of a host write to the virtual volume is performed on the basis of the page management table and page management directory. A function for performing processing which is related to the allocation of real storage area to the virtual volume will be referred to hereinafter as Thin Provisioning function.

FIG. 25 shows the configuration of the page management table 2500 used in the page allocation processing.

In FIG. 25, the page management table 2500 is a table which is used when executing processing to allocate real storage area to virtual volumes, and which comprises a page number field 2501, an LDEV page start address field 2502, a disk number field 2503, a disk page start address field 2504, and an allocated determination information field 2505, and the page management table 2500 exists for each LDEV 322, being stored in the main memory 123 or cache memory 124, and so on.

Each entry of the page number field 2501 stores the page number of the page allocated to the LDEV 322. Each entry of the LDEV page start address field 2502 stores the start address of a page allocated to the LDEV 322. Each entry of the disk number field 2503 stores the number of a disk 132 which the LDEV 322 comprises.

The disk page start address is the start address of a real storage area in a disk and each entry of the disk page start address field 2504 stores the start address of a disk 132 which the LDEV 322 comprises. If a page has been allocated to the LDEV 322, the information Allocated is stored in each entry of the allocated determination information field 2505, and if a page has not been allocated to the LDEV 322, the information Unallocated is stored in each entry. That is, the allocated determination information is used to manage the state of allocation of the real storage area to the virtual storage area, taking the pages as units.

A page is a storage area of a fixed size which is stored in the pool 323 and is a unit for allocating and managing the storage area of the LDEV 322. Furthermore, a page is a collection of one or more tracks, and so on. A track can be of a fixed size, for example 59392 bytes in the storage apparatus 101.

FIG. 26 shows the configuration of a page management directory 2600 which is used in page allocation processing.

In FIG. 26, the page management directory 2600 is a table for managing correspondence relationships between the LDEV 322 and page management tables 2500, and which comprises an LDEV number field 2601 and the address field 2602 of the page management table, the page management directory 2600 being saved in the main memory 123 or the cache memory 124, or on a disk 132, and so on.

Each entry of the LDEV number field 2601 stores the number of an LDEV 322. Each entry of the address field 2602 of the page management table stores an address of a page management table 2500 for managing pages of the LDEV 322.

An example of processing when the command controller 251 receives write access from the MF host computer 102 will be described next. The parameters during write access are the LDEV number and the track number in the LDEV, and so on.

If write access parameters are received from the MF host computer 102, the command controller 251 calculates the address in the LDEV 322 based on the track number and track size of the LDEV 322.

The command controller 251 subsequently refers to the page management directory 2600 and acquires the address of the page management table 2500 corresponding to the LDEV number.

The command controller 251 subsequently refers to the page management table 2500 corresponding to the acquired address, searches for the page containing the track indicated by the address in the write access destination, and acquires the page number obtained in the search and an offset address from the page start address to the write access destination track.

Thereafter, the command controller 251 refers to the allocated determination information in the page entry of the acquired page number, and if the allocated determination information indicates an allocated state, the command controller 251 performs write access to the data part 325 of the write access destination track number which is specified by the page start address in the disk corresponding to the page entry.

If the allocated determination information is in an unallocated state, the command controller 251 refers to the management table 700 to acquire a pool number which corresponds to an LDEV number, refers to the management table 800 on the basis of the acquired pool number to acquire the disk number corresponding to the pool number, and allocates the real storage area in page units from one or more disks 132 which belong to the pool 323 corresponding to the LDEV number 322 on the basis of the acquired disk number.

Here, the command controller 251 refers to the page management table 2500, seeks the page entry which contains the track indicated by the write access destination address, registers the start address of the newly allocated page in the page management table 2500, and updates Unallocated in the allocated determination information field 2502 to Allocated, and updates the page management table 2500.

Processing for allocating pages from a pool to a virtual volume was described hereinabove.

<Page Allocation Processing if 3390-A Format LDEV 322 is Constructed on a Virtual Volume>

Figure 27:
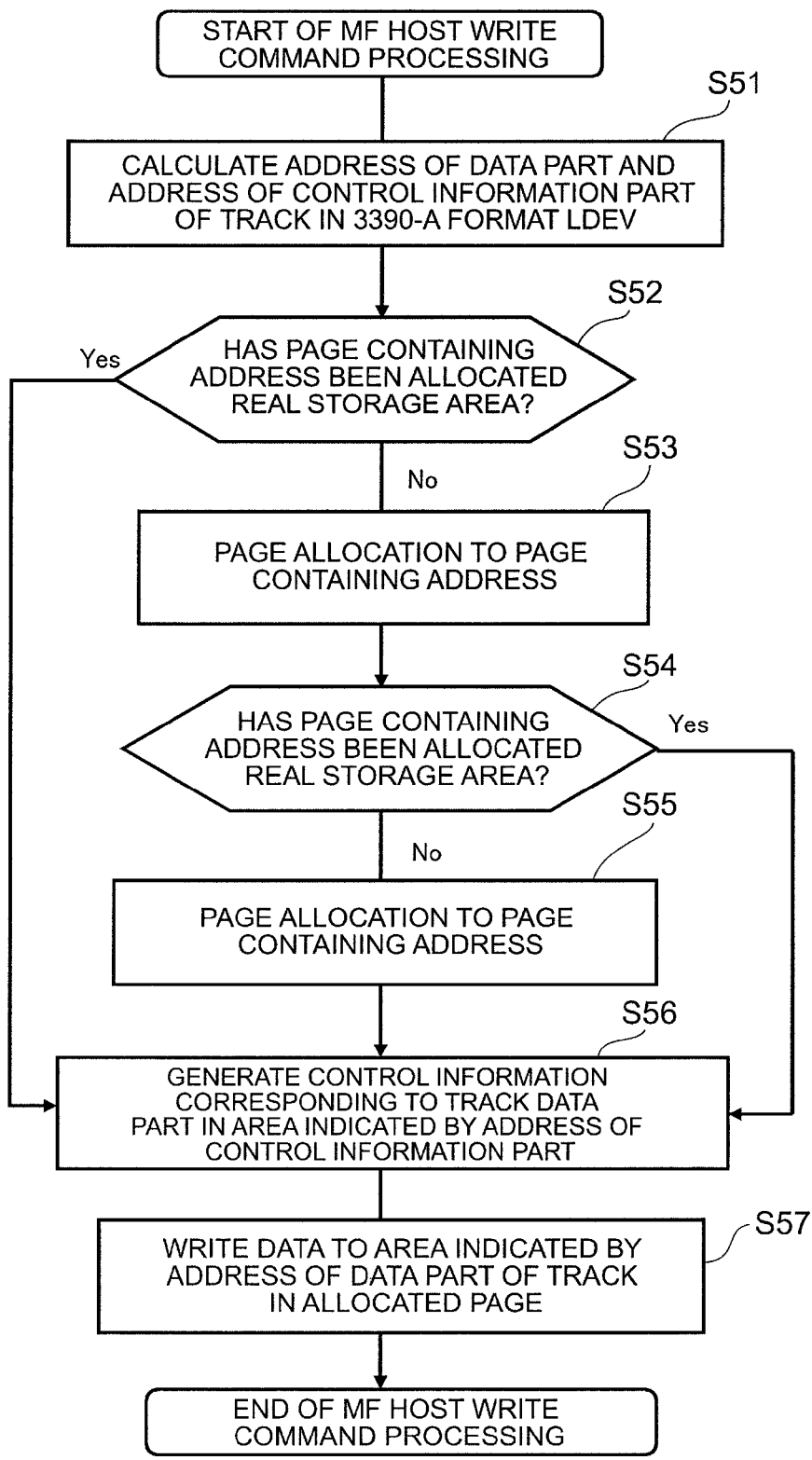
FIG. 27 is a flowchart illustrating MF host write command processing in a fifth embodiment.

Processing will be described next with reference to the flowchart of FIG. 27 and in which processing pages are allocated to each of the user data areas and to each of the control information areas corresponding to the user data areas, in the event of write access of the MF host computers 102 in cases where a 3390-A format LDEV 322 is constructed in a virtual volume.

Processing when the command controller 251 receives write access from the MF host computer 102 via the MF host I/F 121 will be described hereafter.

The parameters during write access are the LDEV number in the 3390 format LDEV 322 and the track number in the LDEV, and so on.

First, upon starting the MF host write command processing, the command controller 251 refers to the management table 500 of FIG. 5, acquires the volume capacity of the LDEV 322, and calculates the address of the data part 325 of the track in the LDEV 322 corresponding to the track number of the LDEV 322 and likewise the address of the control information part 326 of the track, based on the acquired volume capacity and preset track size of the LDEV 322.

Thereafter, the command controller 251 refers to the management table 1700 to acquire the sizes of the distributed user data and distributed control information, refers to the management table 1800 to acquire the start addresses of the distributed user data area and distributed control information area, and calculates the address of the data part 325 of the track in the 3390-A format LDEV (data address) and the address of the control information part 326 (control information address) on the basis of the sizes of the acquired distributed user data and distributed control information, the start addresses of the distributed user data area and distributed control information area, and the address of the data part 325 (the data address) and the address of the control information part 326 (the control information address) which are obtained in this calculation (S51).

The command controller 251 subsequently refers to the page management directory 2600 on the basis of the LDEV number and acquires the address of the page management table 2500 corresponding to the LDEV number.

The command controller 251 refers to the page management table 2500 which corresponds to the acquired address, and acquires each of the page numbers of the pages which contain the data indicated by the address (data address) and address (control information address) obtained in this calculation.

The command controller 251 refers to the allocated determination information in the page entry corresponding to the acquired page number in the page management table 2500, determines whether or not the page containing the address (data address) has been allocated real storage area (S52), and if the allocated determination information indicates an allocated state, that is, if it is determined that real storage area has been allocated, the command controller 251 advances to the processing of step S56.

On the other hand, if the allocated determination information is in an unallocated state, that is, if it is determined that the page containing the address (data address) has not been allocated real storage area, the command controller 251 refers to the management table 700 to acquire a pool number which corresponds to an LDEV number, refers to the management table 800 on the basis of the acquired pool number to acquire the disk number corresponding to the pool number, and, on the basis of the acquired disk number, allocates real storage area in page units from one or more disks 132 which belong to the pool 323 corresponding to the LDEV number 322 (S53). That is, page allocation to the page containing the address (data address) is executed.

The command controller 251 subsequently determines whether or not the page containing the address (control information address) has been allocated real storage area (S54), and if the allocated determination information indicates an allocated state, that is, if it is determined that real storage area has been allocated, the command controller 251 advances to the processing of step S56.

If it is determined in step S54 that the page containing the address (control information address) has been allocated real storage area, the command controller 251 refers to the management table 700 to acquire a pool number which corresponds to an LDEV number, refers to the management table 800 on the basis of the acquired pool number to acquire the disk number corresponding to the pool number, and allocates the real storage area in page units from one or more disks 132 which belong to the pool 323 corresponding to the LDEV number 322 on the basis of the acquired disk number (S55), and advances to the processing of step S56. That is, in step S55, page allocation to the page containing the address (control information address) is executed.

In step S56, the command controller 251 generates control information which corresponds to the data part 325 of the track in an area indicated by the address (control information address).

If the page containing the address (data address) has been allocated real storage area, the command controller 251 writes data to the area indicated by the address (data address). That is, the command controller 251 performs write access to the data part 325 with the page write access destination track number (S57).

Here, the command controller 251 refers to the page management table 2500, seeks the page entry containing the track indicated by the address in the write access destination, registers the newly allocated page start address to the page management table 2500, changes Unallocated in the allocated determination information field 2502 to Allocated, updates the page management table 2500, and ends the processing of this routine.

The command controller 251 may perform write access after initializing the control information area to which the address (control information address) belongs in the aforementioned page allocation processing.

According to this embodiment, if the real storage area is allocated to the virtual volume, the page of the data part 325 and the page of the control information part 326 can be allocated from the pool.

Embodiment 6

This embodiment is configured such that if the copy target data is transmitted as the data according to the remote copy processing to the copy destination storage controller from the copy source storage controller and if the copy destination storage controller receives the copy target data, the copy destination storage controller determines the information relating to the existence of a record in the received copy target data, and executes processing according to the determination result.

<0 Data Page Discard Processing in Sync with the Remote Copy Processing When the 3390-A Format LDEV 322 is Constructed on a Virtual Volume>

Figure 28:
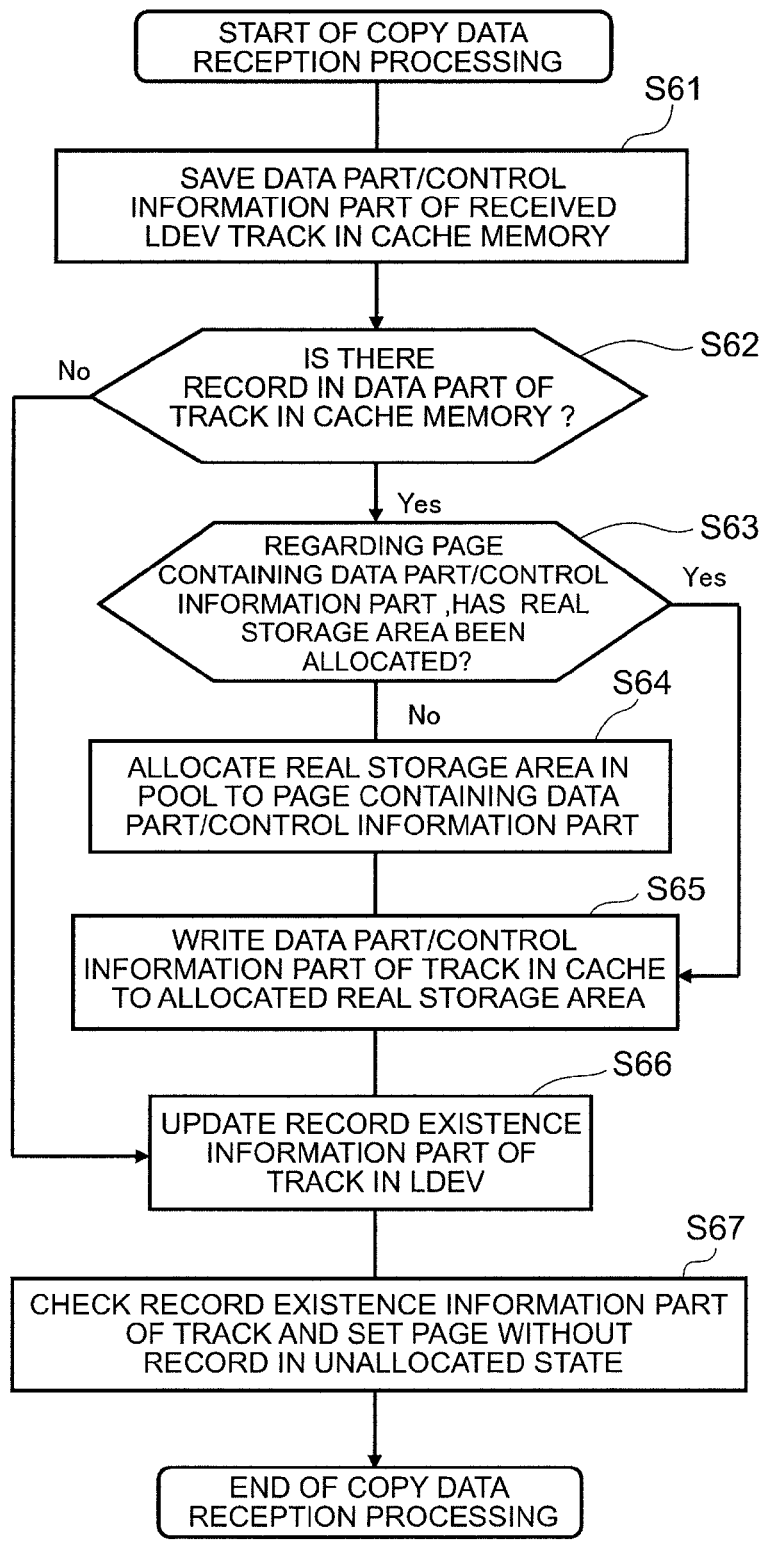
FIG. 28 is a flowchart illustrating copy data reception processing in a sixth embodiment.

FIG. 28 is a flowchart showing processing, in the second storage apparatus, to render the page state in the reception LDEV 322 Unallocated in sync with remote copy processing to transmit data from the first storage apparatus 101 to the 3390-A format LDEV 322 which is saved in the virtual volume.

Returning the page state to unallocated will be referred to as Page Discarding hereafter.

Remote copy processing is executed in a first storage apparatus 101 and a second storage apparatus 101 as below.

If a first command controller 251 in the first storage apparatus 101 receives a remote copy request from the management host 103 via the management host I/F 127 in the first storage apparatus 101, the first command controller 251 takes, as copy target data, the data parts 325 of some or all the tracks of the first LDEV 322 (3390 format or 3390-A format) in the first storage apparatus 101, and the control information parts 326 of some or all the tracks and reads this copy target data from one or more disks 132 to a first cache memory 124.

The first command controller 251 transmits some or all the tracks of the LDEV 322 in the first cache memory in fixed data units via a first host I/F 121 in the first storage apparatus 101 and the network 111. The data units may be data parts 325 of one or more tracks or control information parts 326 of one or more tracks, and so on.

However, when a second command controller 251 in the second storage apparatus 101 receives copy target data from the first command controller 251 via a second host I/F 121 in the second storage controller 101, the second command controller 251 starts copy data reception processing, and writes the received copy target data to a second cache memory 124 in the second storage apparatus 101 (S61).

Here, the second LDEV 322 in the second storage apparatus 101 is constructed, according to the 3390-A format, on a virtual volume which is used by Thin Provisioning function.

The second command controller 251 determines, for each of the data parts 325 in the copy target data saved to the second cache memory 124, whether or not the aforementioned record exists in the track (S62), and if it is determined that the data part 325 of the track in the cache memory 124 has no record, the second command controller 251 advances to the processing of step S66, and if it is determined that there is a record for the data part 325 of the track in the cache memory 124, the second command controller 251 advances to the processing of step S63. Here, the second command controller 251 saves the results of checking whether or not there is a record for each track, in the record existence information part 327 corresponding to the data part 325 of each track in the second LDEV 322.

In step S63, the second command controller 251 determines whether or not the page containing the data part 325 or control information part 326 has been allocated real storage area.

More specifically, the second command controller 251 refers to the page management table 2500 and the page management directory 2600 on the basis of the LDEV number of the LDEV 322 and checks whether or not a write destination page has been allocated from the pool 323 to the write destination virtual area of the data part 325 and control information part 326 which belong to the copy target data, which is a write destination virtual area in the second cache memory 124.

If it is determined that the page containing the data part 325 or control information part 326 has not been allocated real storage area, the second command controller 251 allocates real storage area in the pool 323 to the page containing the data part 325 or control information part 326 (S64).

More specifically, if the write destination page of the data part 325 of one or more tracks in the second cache memory 124 is in an unallocated state and there is a record in the data parts 325 of these tracks, the second command controller 251 refers to the management table 700 on the basis of the LDEV number of the LDEV 322, acquires a pool number which corresponds to the LDEV number, refers to the management table 800 on the basis of the acquired pool number, acquires a disk number corresponding to the pool number, and allocates the real storage area in page units from one or more disks which belong to the pool 323 corresponding to the LDEV number of the LDEV 322.

Likewise, if the write destination page of the control information part 326 of one or more tracks in the second cache memory 124 is in an unallocated state, the second command controller 251 refers to the management table 700 on the basis of the LDEV number of the LDEV 322 to acquire a pool number which corresponds to the LDEV number, refers to the management table 800 on the basis of the acquired pool number to acquire a disk number corresponding to the pool number, and, based on the acquired disk number, allocates the real storage area in page units from one or more disks which belong to the pool corresponding to the LDEV number of the LDEV 322.

The second command controller 251 subsequently writes the data parts 325 and the control information parts 326 in the second cache memory 124 to the allocated real storage area (S65).

More specifically, if the write destination page of the data part 325 which belongs to the copy target data is in a state of being allocated to the write destination virtual area in the second cache memory 124, the second command controller 251 writes the data parts 325 which belong to the copy target data in the second cache memory 124 to one or more second disks 132 which form part of the real storage area in the pool 323.

Similarly, if the write destination page of the control information part 326 which belongs to the copy target data is in a state of being allocated to the write destination virtual area in the second cache memory 124, the second command controller 251 writes the control information parts 326 which belong to the copy target data in the second cache memory 124 to one or more disks 132 which form part of the real storage area in the pool 323.

The second command controller 251 subsequently seeks, based on the page management table 2500, the page entry which contains the data part 325 of the track of the write access destination, registers the start address of the newly allocated page, and updates the allocated determination information to an allocated state. Likewise, the second command controller 251 seeks, based on the page management table 2500, the page entry which contains the control information part 326 of the track of the write access destination, registers the start address of the newly allocated page, and updates the allocated determination information to an allocated state.

The second command controller 251 subsequently writes the aforementioned data parts 325 of one or more tracks to one or more second disks 132 that form part of the real storage area in the pool 323, and writes the control information parts 326 of the one or more tracks to one or more second disks 132 that form part of the real storage area in the pool 323.

Thereafter, in step 66, the second command controller 251 saves information indicating that there is a record in the record existence information parts 327 which correspond to the data parts 325 of the one or more tracks of the second LDEV 322 and updates the record existence information parts 327.

If the write destination page of the data parts of the one or more tracks in the second cache memory 124 is in an unallocated state and if there is no record in the data parts of these tracks, the second command controller 251 does not allocate a page from the pool 323 to the write destination virtual area of the second cache memory 124. In this case, the second command controller 251 does not write the data parts 325 of the one or more tracks to the one or more second disks 132. Furthermore, the second command controller 251 saves information indicating a state where there is no record in the record existence information parts 327 which correspond to the data parts 325 of the tracks of the second LDEV 322.

If the write destination page of the data parts of the one or more tracks in the second cache memory 124 is in an unallocated state and if there is no record in the data parts of these tracks, the second command controller 251 may write an initial value indicating that there is no record after allocating a page from the pool 323.

Furthermore, in step S66, the second command controller 251 checks for the existence of a record of the data parts 325 in the tracks in allocated pages of the second LDEV 322, saves information indicating that there is no record in the record existence information parts 327 of the tracks where no record exists and updates the record existence information parts 327.

The second command controller 251 then checks for the existence of records in the data parts 325 of the tracks in allocated pages of the second LDEV 322 on the basis of the values of the record existence information parts 327 of all the tracks in the second LDEV 322, implements a state where pages with no record are placed in an unallocated state, that is, executes page discarding (S67), and ends the processing of this routine.

In this embodiment, with the first storage controller 131 in the first storage apparatus 101 serving as the other controller, the second storage controller 131 in the second storage apparatus exchanges information via the network 111 and the first storage controller 131, and determines whether or not information relating to records corresponding to tracks exist as information relating to first data parts 325 or second data parts 325 among the information received from the first storage controller 131, stores the determination results in the second control information area of the virtual volume (3390-A format LDEV 322), and if the determination results stored in the second control information area of the virtual volume indicate that a record corresponding to a track does not exist, executes processing to release the page allocated to the virtual volume from the pool as real storage area corresponding to the track in the same way as in remote copy processing.

The aforementioned page discard processing may also be carried out before writing copy target data corresponding to one or more tracks, in the second cache memory 124, to one or more disks 132 in the second cache memory 124.

The foregoing is an example of processing in which remote data copying is implemented with respect to a second LDEV 322 in the second storage apparatus 101 from a first LDEV 322 in the first storage apparatus 101.

According to this embodiment, upon receiving copy target data from the first storage controller 131 in the first storage apparatus 101, the second storage controller 131 in the second storage apparatus 101 is able to check for the existence of records of the data parts 325 of the tracks and place pages for which no record exists in an unallocated state, that is, execute page discard processing.

In this embodiment, in processing in which the first command controller 251 reads copy target data, which includes data parts 325 of one or more tracks and control information parts 326 of one or more tracks, of a transmission-side first LDEV 322, from one or more disks 132 to the first cache memory 124, the first command controller 251 may refer to record existence information parts 327 corresponding to data parts 325 of one or more tracks in the first cache memory 124, and if there is no record in data parts 325 which belong to the copy target data, the first command controller 251 need not transmit the data parts 325 of these tracks to the second storage apparatus. Furthermore, the first command controller 251 may also inform the second storage apparatus, via a message, that there is no record in the data parts 325 of these tracks.

If the MF host computer 102 performs processing in which the values of the control information parts 326 of the tracks are not recognized due to a 3390-format LDEV 322, it is possible to skip over the control information parts 326 of the tracks and thereby reduce the processing overhead of aligning the disk head with the track data parts 325.

Embodiments of the present invention were described hereinabove but the present invention is not limited to these embodiments, rather it is understood that various modifications are possible within the spirit of the invention. For example, address conversion processing when expanding volume capacity in cases where volume capacity has been reduced due to cylinder group removal or the like can also be applied to address conversion processing when volume capacity is reduced.

REFERENCE SIGNS LIST

101 Storage apparatus
102 MF host computer
103 Management host computer
111, 113, 126 Network
122 CPU
123 Main memory
231 Microprogram
124 Cache memory
131 Storage controller
132 Disk
322 LDEV
323 Pool
325 Data part
326 Control information part
327 Record existence information part
901 Storage area
920, 930 Real storage area
1401 to 1405 Distributed user data area
1411 to 1415 Distributed control information area
1421 to 1422 Cylinder group (CG)
2202, 2203 LDEV

What is claimed:
1. A storage system comprising:
a storage controller configured to form a virtual volume which is a virtual storage area configured to be a plurality of given size pages, and configured to be a data area and a control information area on the virtual volume, the data area is configured to be a plurality of data parts each of which stores data and the control information area is configured to be a plurality of control information parts each of which stores control information for accessing each of the data parts, respectively; and
a storage medium providing the virtual volume with physical storage areas,
wherein the storage controller is configured to perform the steps of:
expanding the virtual volume on a group basis where the group is a set of the data area and the control information area, where the data area and the control information area each has a given size, respectively; and
when receiving a write request for a first data part of the plurality of data parts, allocating a first physical storage area of the physical storage areas to a first page including the first data part if a physical storage area is not already allocated to the first page, and allocating a second physical storage area of the physical storage areas to a second page including a first control information part of the plurality of control information parts if a physical storage area is not already allocated to the second page, where the first control information part stores control information for accessing to the first data part.
2. The storage system according to claim 1, wherein the data area which is configured to be a plurality of data parts each of which stores data and the control information area which is configured to be a plurality of control information parts each of which stores control information for accessing each of the data parts, respectively, are each managed by the controller such that the virtual volume is expanded in units of the data area and the control information area on the group basis where the group is a set of the data area and the control information area.

* * * * *